United States Patent
Kinsey et al.

(10) Patent No.: US 12,200,603 B2
(45) Date of Patent: Jan. 14, 2025

(54) SYSTEMS AND METHODS FOR DETERMINING NETWORK IDENTIFIERS OF USER DEVICES

(71) Applicant: Volta Charging, LLC, San Francisco, CA (US)

(72) Inventors: Jeffrey Kinsey, San Francisco, CA (US); Ramsey Rolland Meyer, San Francisco, CA (US); Stefan Martin, Cleveland, OH (US)

(73) Assignee: Volta Charging, LLC, San Francisco, CA (US)

( * ) Notice: Subject to any disclaimer, the term of this patent is extended or adjusted under 35 U.S.C. 154(b) by 506 days.

(21) Appl. No.: 17/521,692

(22) Filed: Nov. 8, 2021

(65) Prior Publication Data

US 2022/0150799 A1     May 12, 2022

Related U.S. Application Data

(60) Provisional application No. 63/111,449, filed on Nov. 9, 2020.

(51) Int. Cl.
*H04W 48/04* (2009.01)
*B60L 53/30* (2019.01)
(Continued)

(52) U.S. Cl.
CPC .......... *H04W 48/04* (2013.01); *B60L 53/305* (2019.02); *B60L 53/665* (2019.02); *H04W 8/005* (2013.01); *H04W 8/18* (2013.01); *H04W 60/04* (2013.01)

(58) Field of Classification Search
CPC ....... H04W 8/005; H04W 8/18; H04W 48/04; H04W 60/04; B60L 53/665; B60L 53/305
See application file for complete search history.

(56) References Cited

U.S. PATENT DOCUMENTS

| | | | |
|---|---|---|---|
| 2002/0045424 A1* | 4/2002 | Lee | H04W 36/302 |
| | | | 455/41.2 |
| 2012/0116575 A1* | 5/2012 | Prosser | B60L 53/18 |
| | | | 705/14.38 |

(Continued)

OTHER PUBLICATIONS

Volta Charging, LLC, International Search Report and Written Opinion, PCT/US2021/058387, Feb. 24, 2022, 14 pgs.

(Continued)

*Primary Examiner* — Raymond S Dean
(74) *Attorney, Agent, or Firm* — Morgan, Lewis & Bockius LLP

(57) ABSTRACT

The disclosed implementations provide systems and methods for tracking a user device. The method includes receiving, from a respective application running on a first electronic device associated with a user, a request initiated by the user to affiliate with a second electronic device. In response to the request by the user to affiliate with the second electronic device, the method includes determining a wireless identifier of the first electronic device. After determining the wireless identifier of the first electronic device, the method includes receiving an indication that a second wireless access point, distinct from the first wireless access point, is in communication with the first electronic device of the user based on the second wireless access point detecting the wireless identifier of the first electronic device. The method further includes determining that the first electronic device of the user is proximal to the second wireless access point.

20 Claims, 12 Drawing Sheets

(51) Int. Cl.
*B60L 53/66* (2019.01)
*H04W 8/00* (2009.01)
*H04W 8/18* (2009.01)
*H04W 60/04* (2009.01)

(56) References Cited

U.S. PATENT DOCUMENTS

| | | | | |
|---|---|---|---|---|
| 2014/0015522 | A1* | 1/2014 | Widmer | B60L 53/126 |
| | | | | 324/239 |
| 2014/0152254 | A1* | 6/2014 | Juhasz | H02J 7/00 |
| | | | | 320/109 |
| 2014/0328248 | A1* | 11/2014 | Greubel | H04W 8/005 |
| | | | | 370/328 |
| 2015/0145648 | A1* | 5/2015 | Winkelman | G07C 9/00571 |
| | | | | 340/5.72 |
| 2015/0365881 | A1* | 12/2015 | Scherzer | H04L 12/2801 |
| | | | | 455/414.1 |
| 2018/0176859 | A1* | 6/2018 | Haines | H04W 4/02 |
| 2019/0222470 | A1* | 7/2019 | Campos | H04W 72/0453 |
| 2019/0262082 | A1* | 8/2019 | Krimsky | A61B 90/361 |
| 2020/0162890 | A1 | 5/2020 | Spencer et al. | |

OTHER PUBLICATIONS

Anonymous, "Google Using Mobile Apps to Crowdsource a Massive Database of WiFi Hot Spots", www.mobilemarketingwatch.com, XP05515864, Jun. 29, 2010, 3 pgs.

Anonymous, "Mac addresses aren't accessible in iOS 11", www.bannaglue.de, XP055890372, Nov. 1, 2018, 3 pgs.

Anonymous, "how to find the MAC Address of a level 2 Blink EVSE ?[crude solution]—Mitsubishi I-Miev Forum", www.myimiev.com, XP055890004, May 3, 2015, 3 pgs.

* cited by examiner

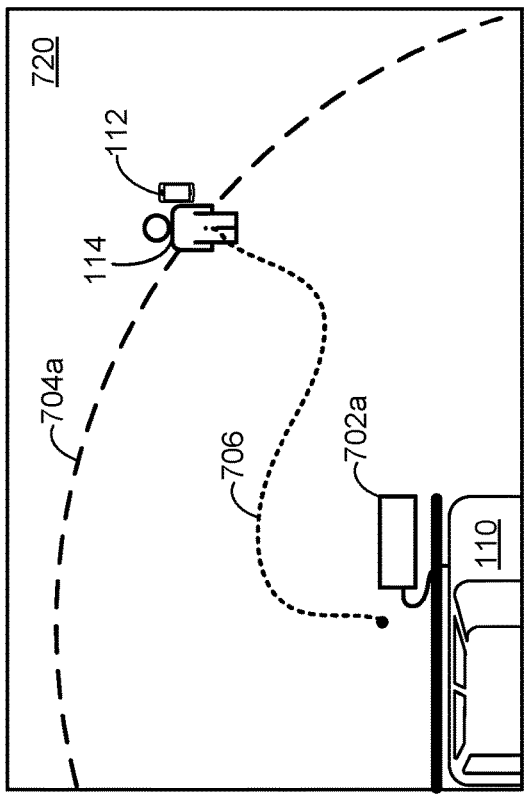
Figure 7A
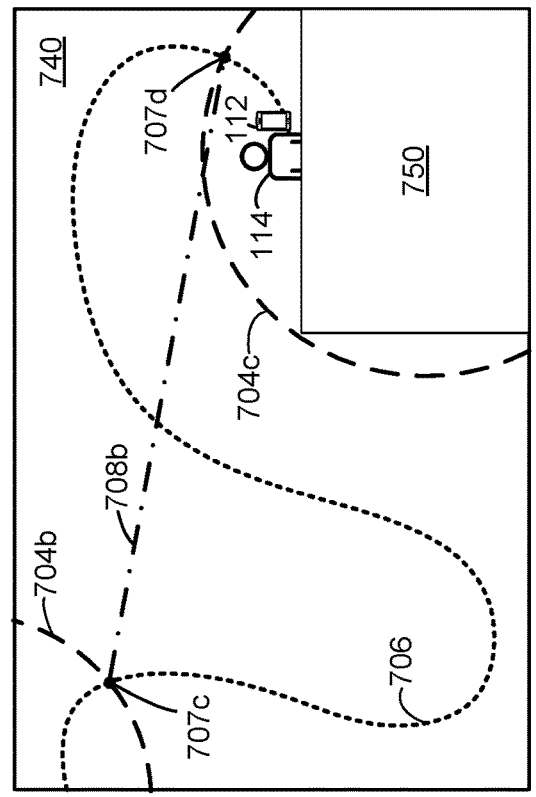
Figure 7B
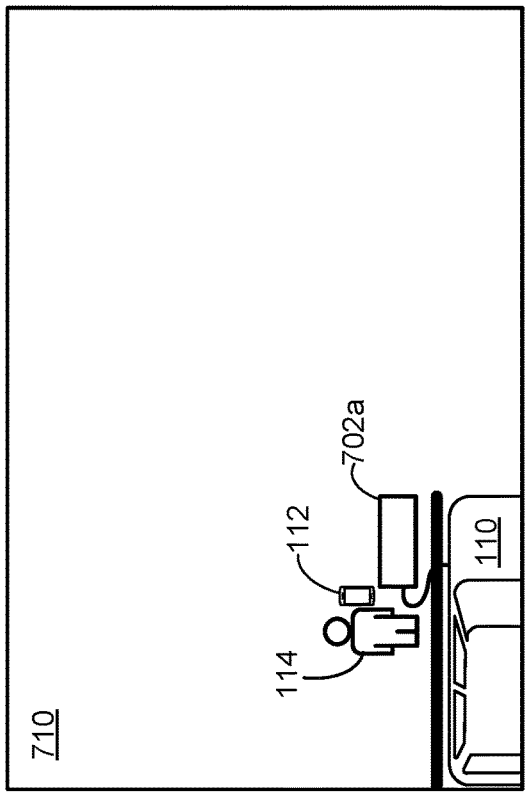
Figure 7C
Figure 7D

SYSTEMS AND METHODS FOR DETERMINING NETWORK IDENTIFIERS OF USER DEVICES

PRIORITY APPLICATION

This application claims priority to U.S. Prov. App. No. 63/111,449, filed Nov. 9, 2020, which is hereby incorporated by reference in its entirety.

TECHNICAL FIELD

This application relates generally to determining network identifiers, such as MAC addresses, of user devices based on a user's proximity to a wireless access point.

BACKGROUND

In network communications, a unique identifier is typically assigned to a network interface controller (NIC) for use as a network address. One example of this type of unique identifier is a media access control (MAC) address, which is commonly used in most IEEE 802 networking technologies, including Ethernet, Wi-Fi, and Bluetooth. MAC addresses are primarily assigned by device manufacturers, and are therefore often referred to as the burned-in address, or as an Ethernet hardware address, hardware address, or physical address. Thus, unlike internet protocol (IP) addresses, MAC addresses are unlikely to change over time.

Unfortunately, because of misuse by a small number of third-party developers, some device manufacturers have made MAC address inaccessible to applications.

SUMMARY

With careful consideration of user's privacy concerns, there are countless legitimate uses of MAC addresses by third-party applications. But because device manufacturers have limited the extent to which third party applications can access MAC addresses, these legitimate uses are not possible. Some implementations of the present disclosure solve this problem by detecting a user's MAC address while the user affiliates with (e.g., checks into, logs into, provides payment to) a second electronic device (e.g., a charging station, a kiosk, etc.) using an application running on the user's device. By assuming that the user is physically proximal to the second electronic device when the user checks into the second electronic device (e.g., as would be the case when the second electronic device is a parking meter or an electric vehicle charging station), the systems and methods described herein are able to determine that a MAC address detected within the vicinity of the second electronic device (e.g., by a wireless access point) corresponds to the user's electronic device. The user's MAC address can then be used for any number of purposes, including to geo-locate the user over time. The disclosed implementations also provide various manners in which to mitigate privacy concerns, such as anonymizing information obtained through use of the MAC address and receiving express permission from the user to use MAC address tracking.

Although the example of a MAC address is used throughout the present disclosure, one of skill in the art will understand that the implementations described herein may be used to determine (and associate with a user) any network and/or wireless identifier that the respective application is unauthorized to access directly from the first electronic device.

Further, although the example of an EVCS is used throughout the present disclosure, one of skill in the art will understand that the second electronic device, as described above, may be any type of device (e.g., a kiosk, a mobile payment station, a parking meter).

In accordance with some implementations, a method is provided for identifying and using a network identifier of a user device. The method is performed at a computer system that includes one or more processors and memory. The method includes receiving, from a respective application running on a first electronic device associated with a user, a request initiated by the user to affiliate with a second electronic device. In response to the request by the user to affiliate with the second electronic device, the method includes determining a wireless identifier of the first electronic device. The wireless identifier is detected using a first wireless access point proximal to the second electronic device. The respective application is unauthorized to access the wireless identifier directly from the first electronic device. After determining the wireless identifier of the first electronic device, the method includes receiving an indication that a second wireless access point, distinct from the first wireless access point, is in communication with the first electronic device of the user based on the second wireless access point detecting the wireless identifier of the first electronic device. The method, based on the indication that the second wireless access point is communicating with the first electronic device, include determining that the first electronic device of the user is proximal to the second wireless access point. In some implementations, the wireless identifier includes a media access control (MAC) address.

In some implementation, prior to receiving the request initiated by the user to affiliate with the second electronic device, the method includes receiving a request, from the user, to register for a service provided by the second electronic device. In response to the request to register for the service provided by the second electronic device, the method includes generating a profile for the user that includes an identifier of the user. After determining the wireless identifier of the first electronic device, the method includes storing the wireless identifier of the first electronic device in the profile for the user.

In some implementations, determining the wireless identifier of the first electronic device includes examining a log of network addresses communicating with the first wireless access point. In some implementations, determining the wireless identifier of the first electronic device includes selecting the wireless identifier from a set of wireless identifiers of devices communicating with the first wireless access point based on a direction from which communications from the first electronic device are received by the first wireless access point. In some implementations, the method includes determining an amount of time that the user is in a geo-fenced region corresponding to the second wireless access point.

In some implementation, the second electronic device is an electric vehicle charging station (EVCS) and the request initiated by the user to affiliate with the second electronic device includes a request to begin charging a vehicle using the EVCS. In some implementations, the second wireless access point is proximal to a third electronic device that includes a display. The method further includes selecting media content based on a profile of the user, and while the second wireless access point is in communication with the first electronic device, displaying, on the display of the third electronic device, the media content selected based on the profile of the user. In some implementations, the third electronic device is a second EVCS.

In some implementations, the method includes receiving an indication that a third wireless access point, distinct from the first wireless access point and the second wireless access point, is communicating with the first electronic device based on the wireless identifier of the first electronic device; and, based on the indication that the third wireless access point is communicating with the first electronic device; and has previously been in communication with the first wireless access point and the second wireless access point, determining that a path of the first electronic device of the user is proximal to the first wireless access point, followed by the second wireless access point, followed by the third wireless access point.

In some implementations, the user is a first user and the second wireless access point is associated with a second user. The method further includes generating a report for the second user indicating that the first user was proximal to the second wireless access point. In some implementations, the report further includes an indication of an amount of time that the first user was proximal to the second wireless access point.

Some implementations of the present disclosure provide a computer system (e.g., a server system or an electric vehicle charging station), comprising one or more processors and memory storing one or more programs. The one or more programs store instructions that, when executed by the one or more processors, cause the computer system to perform any of the methods described herein.

Some implementations of the present disclosure provide a non-transitory computer readable storage medium storing instructions that, when executed by a computer system having one or more processors, cause the computer system to perform any of the methods described herein.

BRIEF DESCRIPTION OF THE DRAWINGS

For a better understanding of the various described implementations, reference should be made to the Detailed Description below, in conjunction with the following drawings in which like reference numerals refer to corresponding parts throughout the Figures.

FIGS. 7A-7D illustrate the affiliation and tracking of a user device by a charging station, in accordance with some implementations.

DETAILED DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

Figure 1:
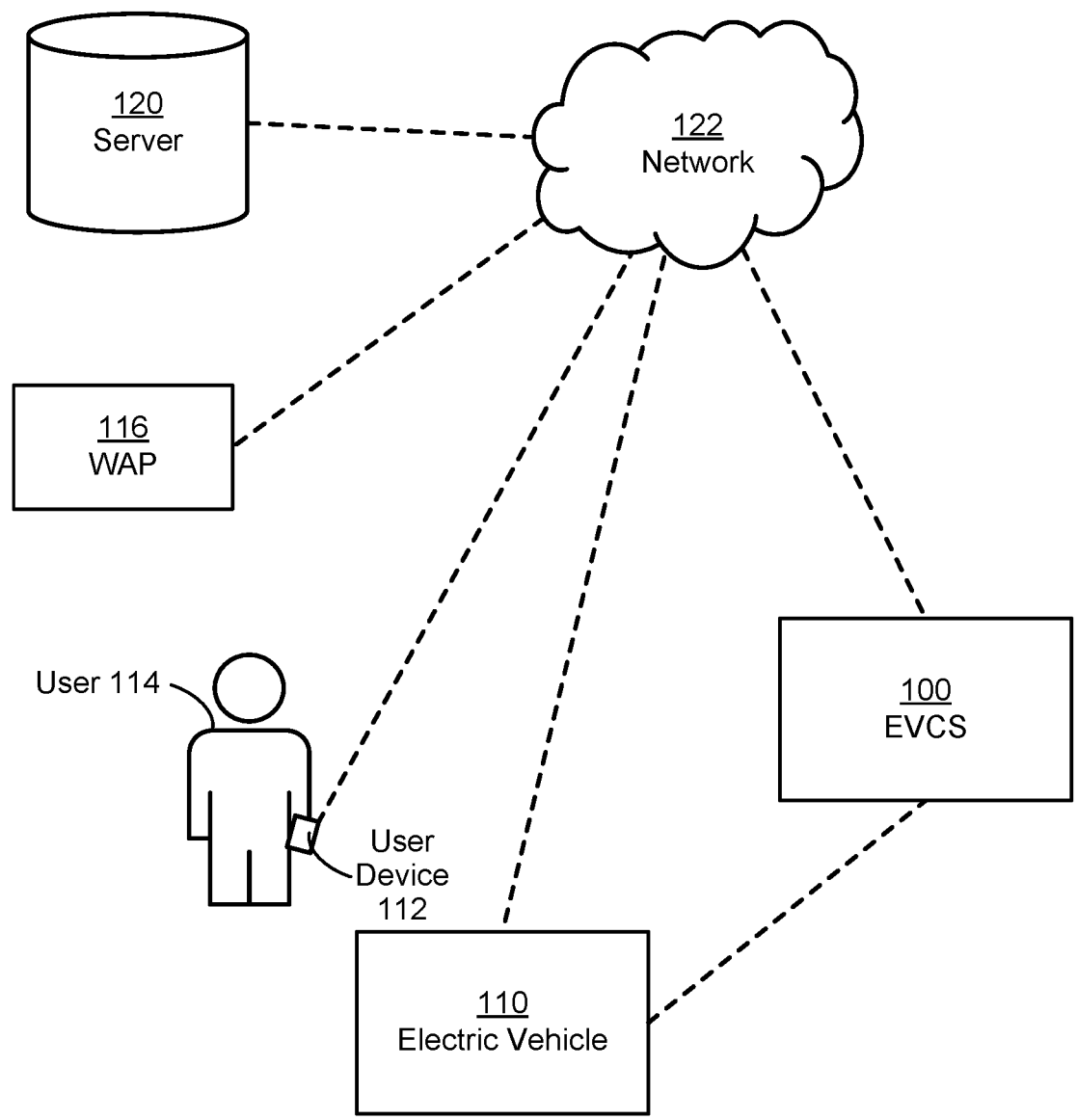
FIG. 1 illustrates a system for charging an electric vehicle, in accordance with some implementations.
Figure 3:
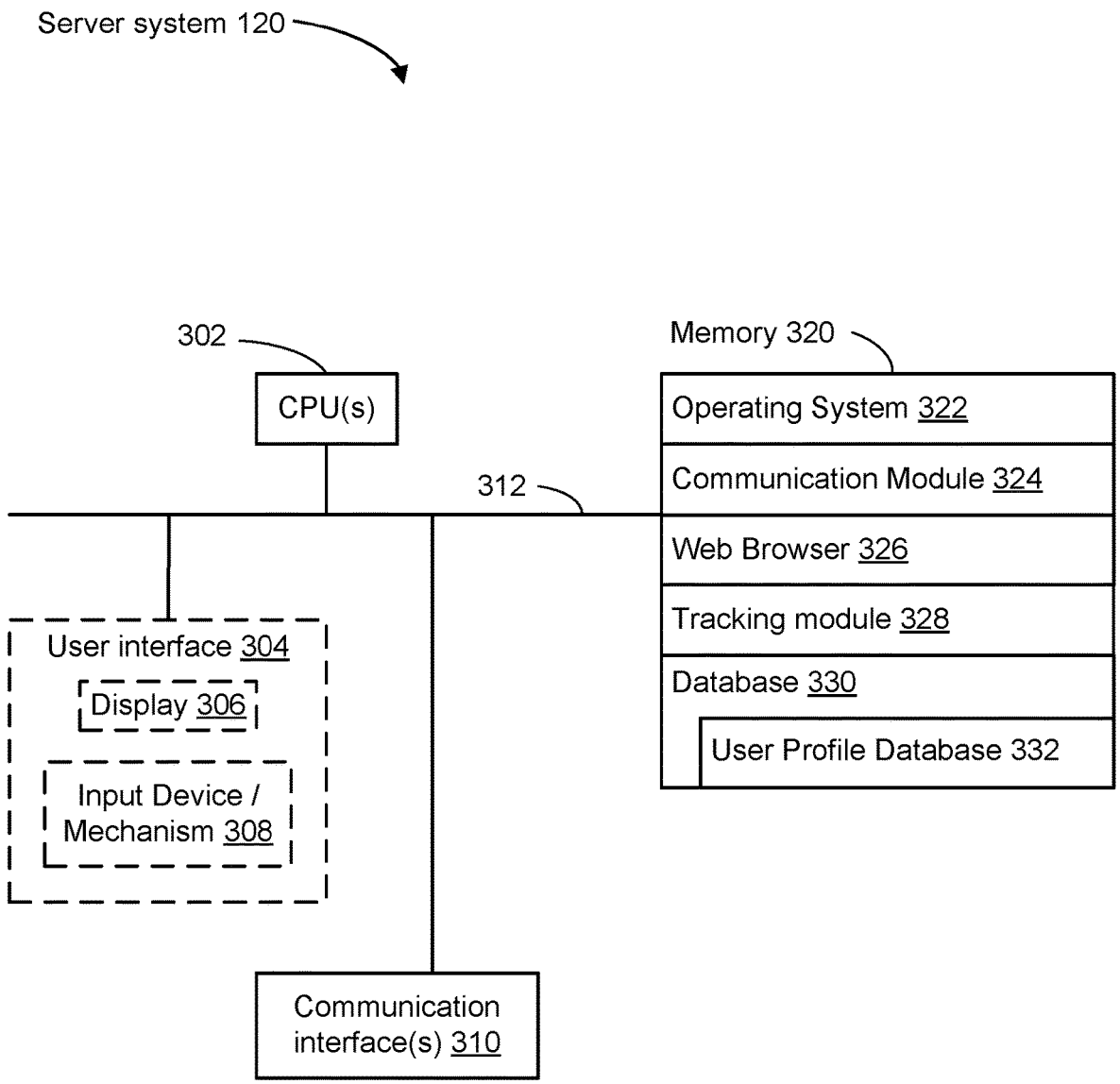
FIG. 3 is a block diagram of a server system, in accordance with some implementations.
Figure 4:
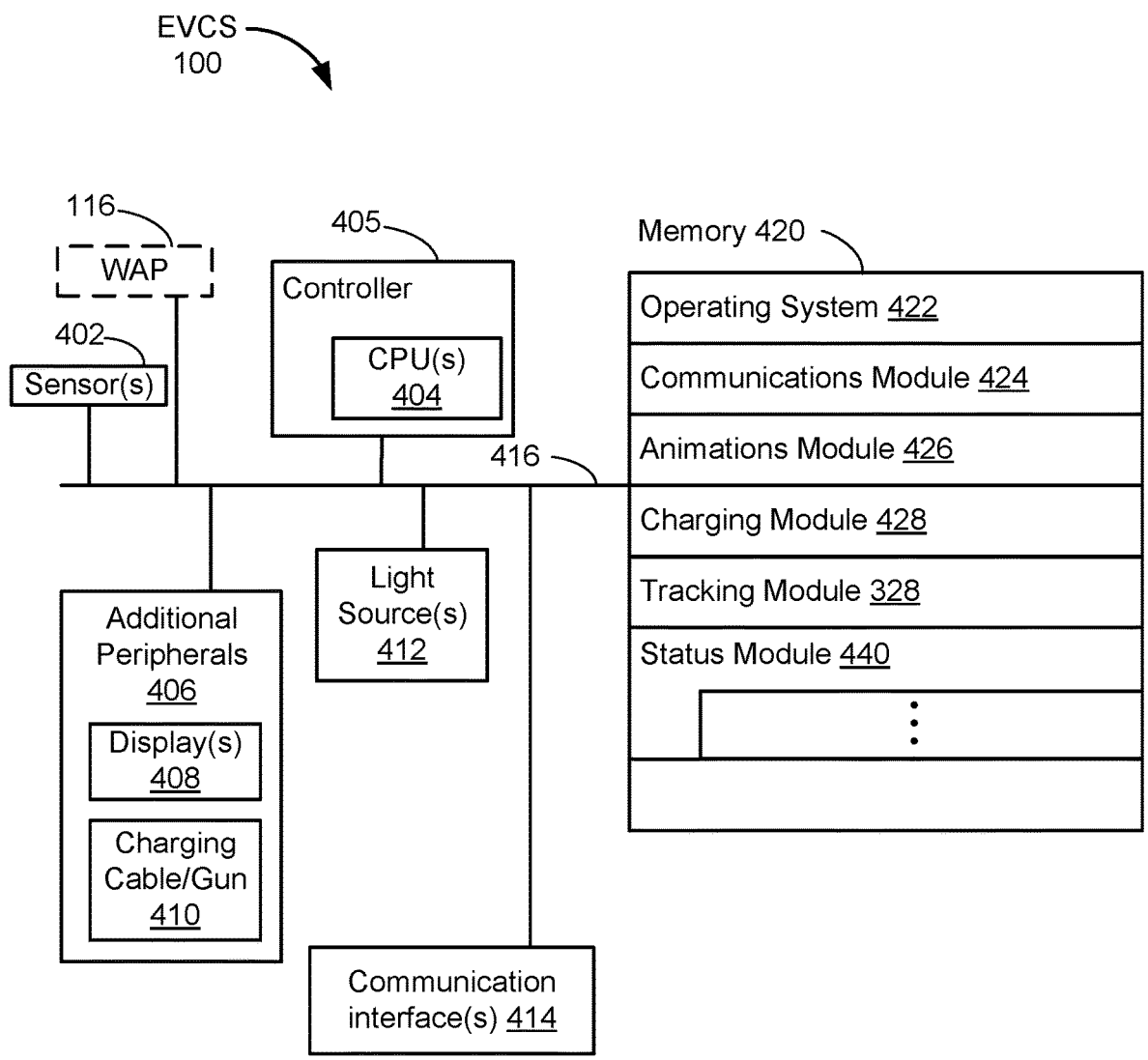
FIG. 4 is a block diagram of a charging station for an electric vehicle, in accordance with some implementations.

FIG. 1 illustrates an electric vehicle charging station (EVCS) 100 that is configured to provide an electric charge to an electric vehicle 110 via one or more electrical connections. In some implementations, the EVCS 100 provides an electric charge to electric vehicle 110 via a wired connection, such as charging cable. Alternatively, the EVCS 100 may provide an electric charge to electric vehicle 110 via a wireless connection (e.g., wireless charging). In some implementations, the EVCS 100 may be in communication with the electric vehicle 110 or a user device 112 belonging to a user 114 (e.g., a driver, passenger, owner, renter, or other operator of the electric vehicle 110) that is associated with the electric vehicle 110. In some implementations, the EVCS 100 communicates with one or more devices or computer systems, such as user device 112 and/or server system 120, respectively, via a network 122. In some implementations, one or more Wireless Access Points (WAPs) 116 communicate with the one or more devices or computer systems, such as the EVCS 100, user device 112, and/or server system 120, respectively, via a network 122. In some implementations, the one or more WAPs 116 are part of or associated with one or more locations (e.g., parks, shopping malls), businesses (e.g., retail stores, apartments, movie theaters, restaurants). Alternatively or additionally, in some implementations, one or more WAPs 116 are associated or formed with (e.g., within a housing of) the EVCS 100 (e.g., communication interface(s) 414; FIG. 4) or the server system 120 (e.g., communication interface(s) 310; FIG. 3).

Figure 2A:
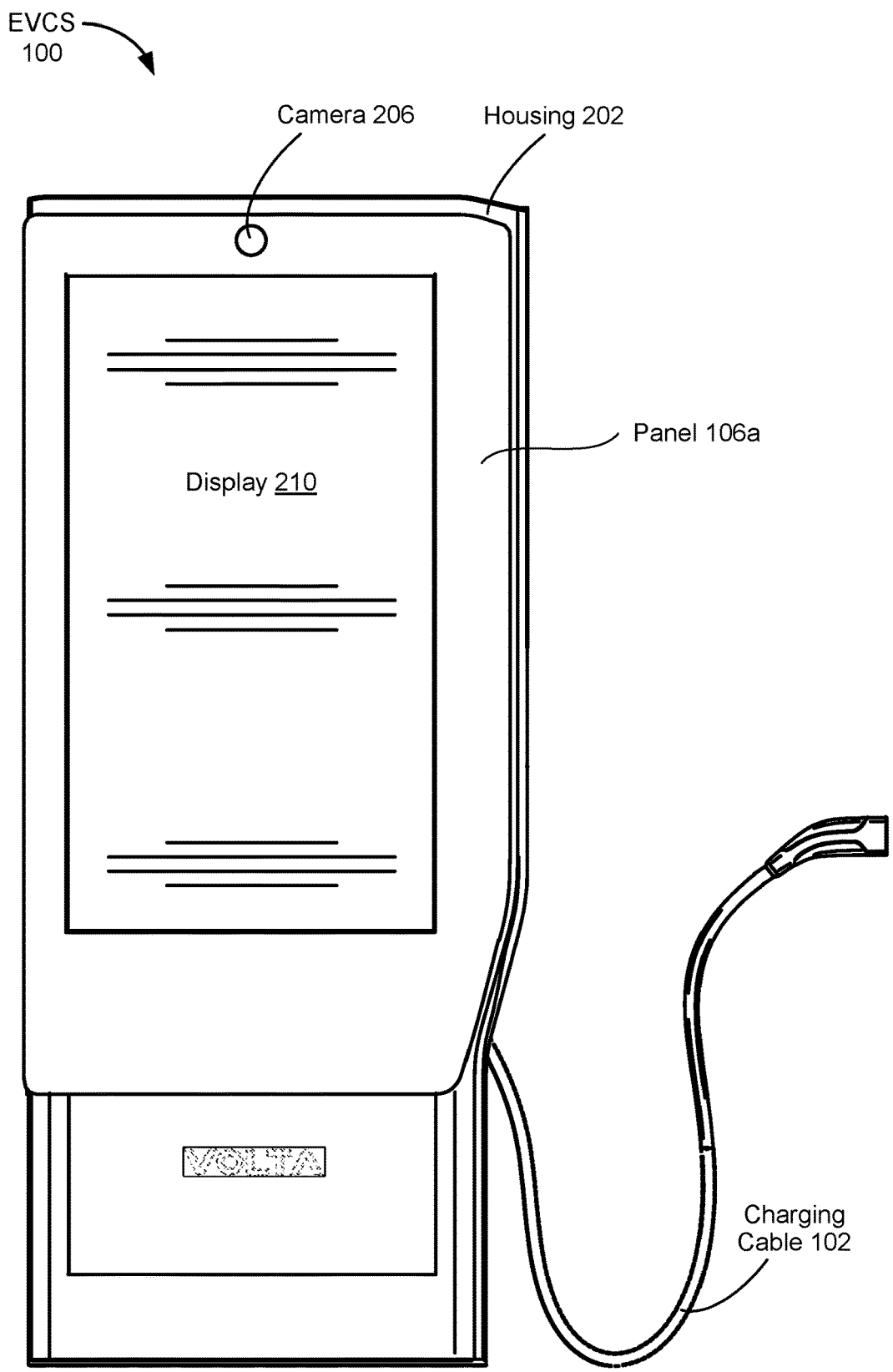
FIGS. 2A-2C illustrate a charging station for an electric vehicle, in accordance with some implementations.
Figure 2B:
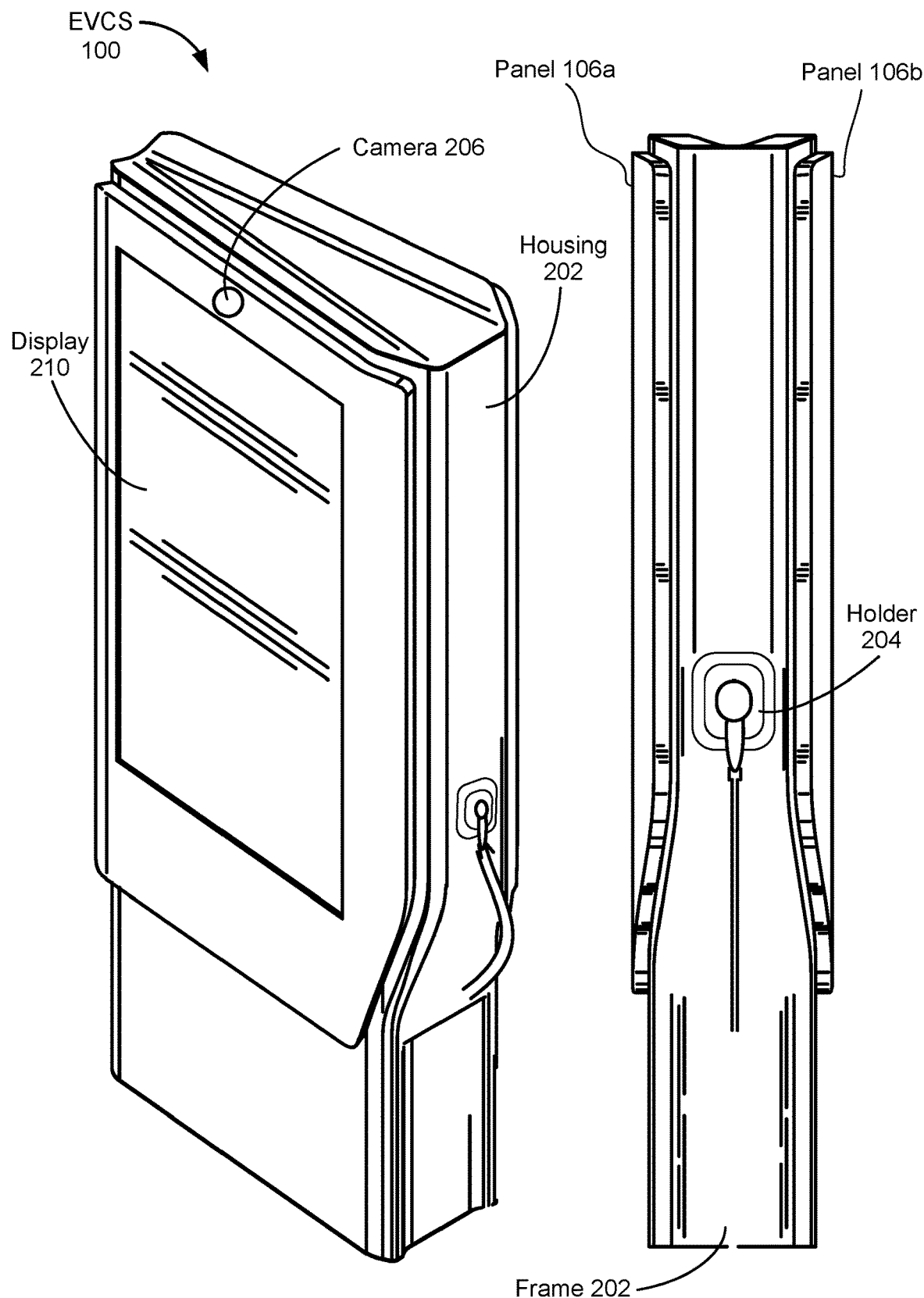
Figure 2C:
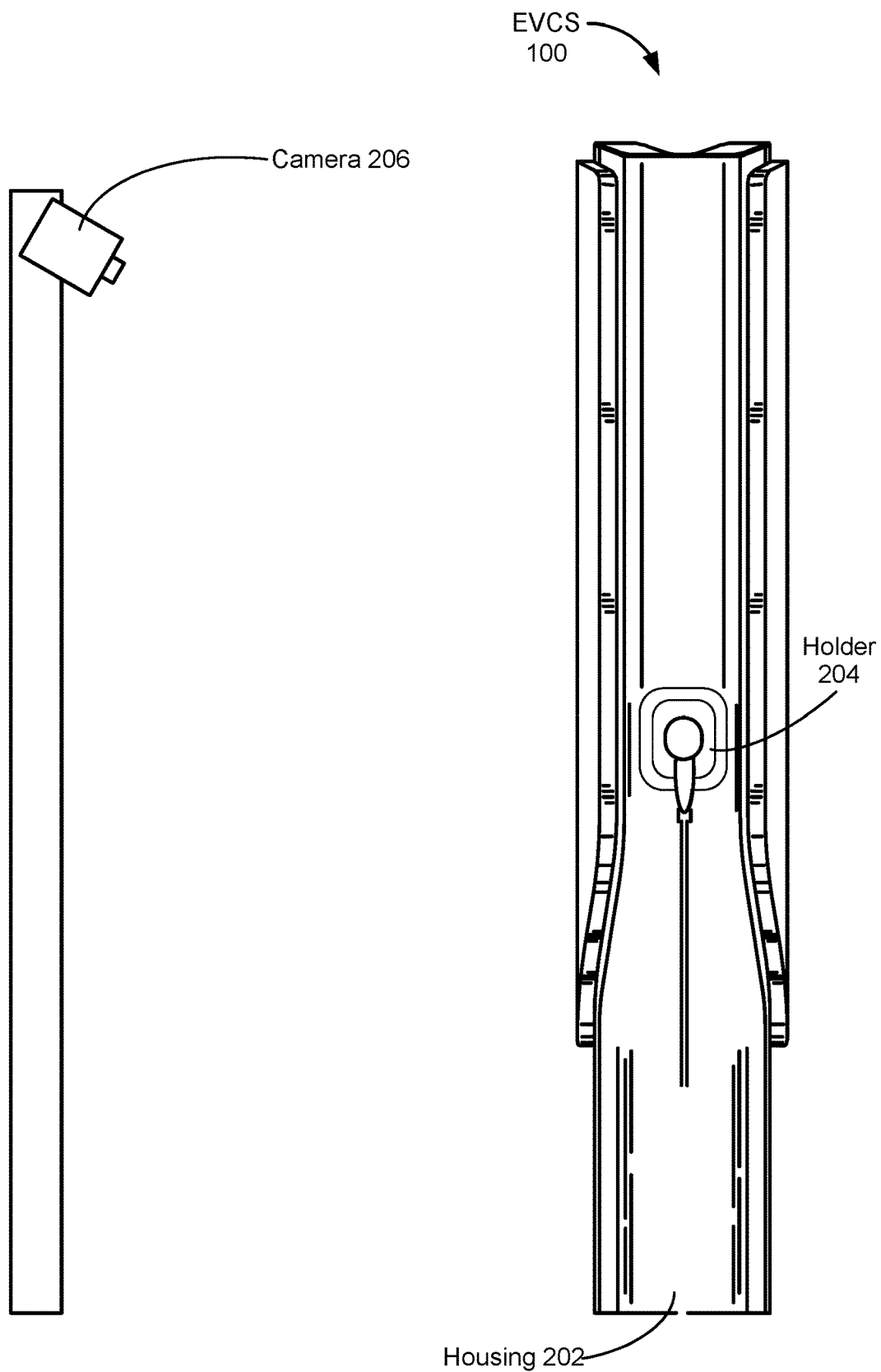

FIG. 2A is a mechanical drawing showing various views of an electric vehicle charging station (EVCS) 100, in accordance with some implementations. FIG. 2B is a mechanical drawing showing additional views of the EVCS 100 of FIG. 2A, in accordance with some implementations. FIG. 2C shows an alternative configuration of EVCS 100, in accordance with some implementations. FIGS. 2A-2C are discussed together below.

EVCS 100 includes a housing 202 (e.g., a body or a chassis) including a charging cable 102 (e.g., connector) configured to connect and provide a charge to an electric vehicle 110 (FIG. 1). An example of a suitable connector is an IEC 62196 type-2 connector. In some implementations, the connector is a "gun-type" connector (e.g., a charge gun) that, when not in use, sits in a holder 204 (e.g., a holster). In some implementations, the housing 202 houses circuitry for charging an electric vehicle 110. For example, in some implementations, the housing 202 includes power supply circuitry as well as circuitry for determining a state of a vehicle being charged (e.g., whether the vehicle is connected via the connector, whether the vehicle is charging, whether the vehicle is done charging, etc.).

The EVCS 100 further includes one or more displays 210 facing outwardly from a surface of the EVCS 100. For example, the EVCS 100 may include two displays 210, one on each side of the EVCS 100, each display 210 facing outwardly from the EVCS 100. In some implementations, the one or more displays 210 display messages (e.g., media content) to users of the charging station (e.g., operators of the electric vehicle) and/or to passersby that are in proximity to the EVCS 100.

In some implementations, the EVCS 100 includes one or more panels 106 that hold a display 210. The displays 210 are large compared to the housing 202 (e.g., 60% or more of the height of the frame and 80% or more of the width of the frame), allowing the displays 210 to function as billboards, capable of conveying information to passersby. In some implementations, the displays 210 are incorporated into articulating panels 106 (e.g., panel 106a and panel 106b) that articulate away from the housing 202 (e.g., a sub-frame). The articulating panels 106 solve the technical problem of the need for maintenance of the displays 210 (as well as one or more computers that control content displayed on the display). To that end, the articulating panels 106 provide easy access to the entire back of the displays 210. In addition, in some implementations, the remaining space between the articulating panels (e.g., within the housing 202) is hollow, allowing for ample airflow and cooling of the displays 210.

The EVCS 100 further includes a computer that includes one or more processors and memory. The memory stores instructions for displaying content on the display 210. In some implementations, the computer is disposed inside the housing 202. In some implementations, the computer is mounted on a panel (e.g., panel 106a or panel 106b) that connects (e.g., mounts) a first display (e.g., a display 210) to the housing 202. In some implementations, the computer includes a near-field communication (NFC) system that is configured to interact with a user's device (e.g., user device 112 of a user 114 of the EVCS 100). In some embodiments, EVCS 100 includes a WAP 116. In some implementations, the WAP 116 is formed with the EVCS 100. For example, the WAP 116 can reside within the housing 202 of the EVCS 100 (e.g., mounted on panel 106a and/or panel 106b). In other words, in some embodiments, the WAP 116 is part of the EVCS 100. Alternatively, in some implementations, the WAP 116 is separate from the EVCS 100 but located close enough (e.g., less than 1 meter) to the EVCS 100 to detect electronic devices (including the user device 112) near the EVCS 100. For example, the WAP 116 is configured to communicate with a user standing next to the EVCS 100. The WAP 116 communicates with the EVCS 100 via a wired or wireless connection.

In some implementations, the EVCS 100 includes one or more sensors (sensors 402; FIG. 4) for detecting whether external objects are within a predefined region (area) proximal to the housing 202. For example, the area proximal to the EVCS 100 includes one or more parking spaces, where an electric vehicle 110 parks in order to use the EVCS 100. In some implementations, the area proximal to the EVCS 100 includes walking paths (e.g., sidewalks) next to the EVCS 100. In some implementations, the one or more sensors are configured to determine a state of the area proximal to the EVCS 100 (e.g., wherein determining the state includes detecting external objects). The external objects can be living or nonliving, such as people, kids, animals, vehicles, shopping carts, toys, etc. The one or more sensors can detect stationary or moving external objects. The one or more sensors of the EVCS 100 include one or more image (e.g., optical) sensors (e.g., one or more cameras 206), ultrasound sensor, depth sensor, IR/RGB camera, PIR, heat IR, proximity sensors, radar, and a tension sensor. The one or more sensors may be connected to the EVCS 100 or a computer system associated with the EVCS 100 via wired or wireless connections such as via a Wi-Fi connection or Bluetooth connection.

In some implementations, the housing 202 includes one or more lights configured to provide predetermined illumination patterns indicating a status of the EVCS 100. In some implementations, at least one of the one or more lights is configured to illuminate an area proximal to the EVCS 100 as a person approaches the area (e.g., a driver returning to a vehicle or a passenger exiting a vehicle that is parked in a parking spot associated with the EVCS 100).

In some implementations, the housing 202 includes one or more cameras 206 configured to capture one or more images of an area proximal to the EVCS 100. In some implementations, the one or more cameras 206 are configured to obtain video of an area proximal to the EVCS 100. For example, a camera may be configured to obtain a video or capture images of an area corresponding to a parking spot associated with the EVCS 100. In another example, another camera may be configured to obtain a video or capture images of an area corresponding to a parking spot next to the parking spot of the EVCS 100. In a third example, the camera 206 may be a wide angle camera or a 360° camera that is configured to obtain a video or capture images of a large area proximal to the EVCS 100, including a parking spot of the EVCS 100. As shown in FIG. 2B, the one or more cameras 206 may be mounted directly on a housing 202 of the EVCS 100 and may have a physical (e.g., electrical, wired) connection to the EVCS 100 or a computer system associated with the EVCS 100. Alternatively, as shown in FIG. 2C, the one or more cameras 206 (or other sensors) may be disposed separately from but proximal to the housing 202 of the EVCS 100. In some implementations, the camera 206 may be positioned at different locations on the EVCS 100 than what is shown in the figures. Further, in some implementations, the one or more cameras 206 include a plurality of cameras positioned at different locations on the EVCS 100.

FIG. 3 is a block diagram of a server system 120, in accordance with some implementations. Server system 120 may include one or more computer systems (e.g., computing devices), such as a desktop computer, a laptop computer, and a tablet computer. In some implementations, the server system 120 is a data server that hosts one or more databases (e.g., databases of images or videos), models, or modules or may provide various executable applications or modules. The server system 120 includes one or more processing units (processors or cores, CPU(s)) 302, one or more network or other communications interfaces 310 (analogous to WAPs 116), memory 320, and one or more communication buses 312 for interconnecting these components. The communication buses 312 optionally include circuitry (sometimes called a chipset) that interconnects and controls communications between system components. The server system 120 typically includes a user interface 304. The user interface 304 may include a display device 306 (e.g., a screen or monitor). In some implementations, the server system 120 includes one or more input devices 308 such as a keyboard, mouse, and/or other input buttons. Alternatively or in addition, in some implementations, the display device 306 includes a touch-sensitive surface, in which case the display device 306 is a touch-sensitive display.

The memory 320 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 320 includes one or more storage devices remotely located from the processors 302. The memory 320, or alternatively the non-volatile memory devices within the memory 320, includes a non-transitory computer-readable storage medium. In some implementations, the memory 320 or the computer-readable storage medium of the memory 320 stores the following programs, modules, and data structures, or a subset or superset thereof:

- an operating system 322, which includes procedures for handling various basic system services and for performing hardware dependent tasks;
- a communications module 324, which is used for connecting the server system 120 to other computers and devices via the one or more communication interfaces 310 (wired or wireless), such as the Internet, other wide area networks, local area networks, metropolitan area networks, and so on;
- a web browser 326 (or other application capable of displaying web pages), which enables a user to communicate over a network with remote computers or devices;
- a tracking module 328, which is used for determining a wireless identifier (e.g., MAC address) of user devices and tracking the user devices through the wireless identifier;
- database 330 for storing images of vehicles, backgrounds, and/or objects. In some implementations, the server system 120 receives one or more images captured at an EVCS 100 and stores them in database 330. The user profile database 332 further includes user profile database 340 for storing and/or accessing user profiles (e.g., user accounts or usernames), as well as storing and/or accessing user information associated to the user profiles.

In some implementations, the memory 320 may store thresholds and other criteria, which are compared against metrics and/or characteristics determined from a processed image or data from one or more sensors of an EVCS 100.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 320 stores a subset of the modules and data structures identified above. Furthermore, the memory 320 may store additional modules or data structures not described above.

Although FIG. 3 shows a server system 120, FIG. 3 is intended more as a functional description of the various features that may be present rather than as a structural schematic of the implementations described herein. In practice, and as recognized by those of ordinary skill in the art, items shown separately could be combined and some items could be separated.

FIG. 4 is a block diagram of an EVCS 100 (FIGS. 1 and 2A through 2C) for charging an electric vehicle, in accordance with some implementations. The EVCS 100 typically includes a motor 403 (configured to retract a portion of a charging cable), a controller 405 that includes one or more processing units (processors or cores) 404, one or more network or other communications interfaces 414, WAPs 116, memory 420, one or more light sources 412, one or more sensors 402, additional peripherals 406, and one or more communication buses 416 for interconnecting these components. The communication buses 416 optionally include circuitry (sometimes called a chipset) that interconnects and controls communications between system components. In some implementations, the memory 420 stores instructions for performing (by the one or more processing units 404) a set of operations, including determining a status of the EVCS 100, wherein the status indicates a state of an electric vehicle 110 at the charging station. Note that the controller used to energize the motor to retract a portion of the charging cable, as described with respect to method 800, may be the same or different from the controller that controls other operations of the EVCS 100 (e.g., controls animations). In addition, in various implementations, the controller used to energize the motor may be embodied as a one or more processors or cores, a field programmable gate array (FPGA) or an application specific integrated circuit (ASIC). Moreover, the controller may be embodied as software, hardware, firmware, or a combination thereof.

EVCS 100 typically includes additional peripherals 406 such as one or more displays (corresponding to displays 210 shown in FIGS. 2A and 2B) for displaying content, and a charging cable 410 (e.g., charging cable 102 shown in FIGS. 2A, and 2B, also referred to as a charging gun) for connecting the EVCS 100 to an electric vehicle for charging the electric vehicle. In some implementations, the displays 408 may be a touch-sensitive display that is configured to detect various swipe gestures (e.g., continuous gestures in vertical and/or horizontal directions) and/or other gestures (e.g., a single or double tap) or to detect user input via a soft keyboard that is displayed when keyboard entry is needed.

The user interface may also include one or more sensors 402 such as cameras (e.g., camera 206, described above with respect to FIGS. 2A and 2B), ultrasound sensors, depth sensors, infrared cameras, visible (e.g., RGB or black and white) cameras, passive infrared sensors, heat detectors, infrared sensors, proximity sensors, or radar. In some implementations, the one or more sensors 402 are for detecting whether external objects are within a predefined region proximal to the housing, such as living and nonliving objects, and/or the status of the EVCS 100 (e.g., available, occupied, etc.) in order to perform an operation, such as retracting the charging cable safely and carefully.

The memory 420 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 420 includes one or more storage devices remotely located from the processors 404, such as database 338 of server system 120 that is in communication with the EVCS 100. The memory 420, or alternatively the non-volatile memory devices within the memory 420, includes a non-transitory computer-readable storage medium. In some implementations, the memory 420 or the computer-readable storage medium of the memory 420 stores the following programs, modules, and data structures, or a subset or superset thereof:

an operating system 422, which includes procedures for handling various basic system services and for performing hardware dependent tasks;

a communications module 424, which is used for connecting the EVCS 100 to other computers and devices via the one or more communication interfaces 414 (wired or wireless), such as the Internet, other wide area networks, local area networks, metropolitan area networks, and so on;

an animations module 426 for animating the one or more light sources 412 to provide predetermined illumination patterns or to provide illumination for passersby and users of the EVCS 100;

a charging module 428 for charging an electric vehicle (e.g., measuring how much charge has been delivered to an electric vehicle, commencing charging, ceasing charging, etc.);

a tracking module 328 analogous to the module described above with reference to FIG. 3; and a status module 440 for monitoring a charging status of the EVCS 100 (e.g., a status of the EVCS 100 with respect to charging of an electric vehicle or its ability/inability to charge an electric vehicle).

In some implementations, the memory 420 stores metrics, thresholds, and other criteria, which are compared against the measurements captured by the one or more sensors 402. For example, data obtained from a PIR sensor of the one or more sensors 402 can be compared with baseline data to detect that an object is in proximity the EVCS 100.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 420 stores a subset of the modules and data structures identified above. Furthermore, the memory 420 may store additional modules or data structures not described above.

Although FIG. 4 shows an EVCS 100, FIG. 4 is intended more as a functional description of the various features that may be present rather than as a structural schematic of the implementations described herein. In practice, and as recognized by those of ordinary skill in the art, items shown separately could be combined and some items could be separated.

Figure 5:
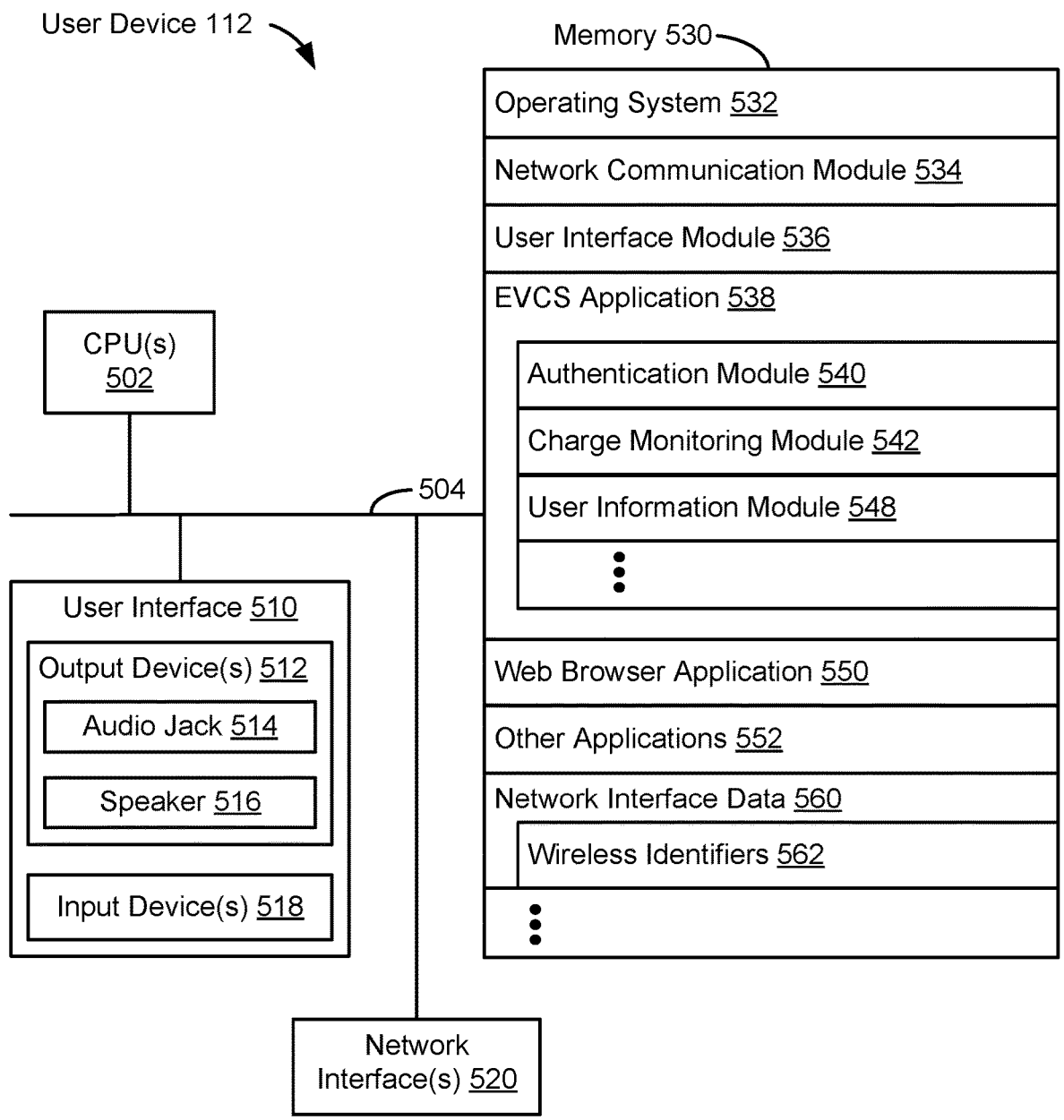
FIG. 5 is a block diagram of a user device, in accordance with some implementations.

FIG. 5 is a block diagram of a user device 112 of a user 114 in accordance with some implementations. In some implementations, the user 114 is associated with (e.g., an operator of) an electric vehicle 110 at EVCS 100. Various examples of the computing device 112 include a cellular-capable smart device such as a smartphone, a smart watch, a laptop computer, a tablet computer, and other computing devices that have a processor capable of connecting to the EVCS 100 via a communications network (e.g., network 122).

The user device 112 typically includes one or more processing units (processors or cores) 502, one or more network or other communications network interfaces 520, memory 530, and one or more communication buses 504 for interconnecting these components. The communication buses 504 optionally include circuitry (sometimes called a chipset) that interconnects and controls communications between system components. The user device 112 typically includes a user interface 510. The user interface 510 typically includes a display (e.g., a screen or monitor). In some implementations, the user device 112 includes input devices 518 such as a keyboard, mouse, and/or other input buttons. Alternatively or in addition, in some implementations, the user device 112 includes a touch-sensitive surface, in which case the display is a touch-sensitive display. In some implementations, the touch-sensitive surface is configured to detect various swipe gestures (e.g., continuous gestures in vertical and/or horizontal directions) and/or other gestures (e.g., single/double tap). In computing devices that have a touch-sensitive surface (e.g., a touch-sensitive display), a physical keyboard is optional (e.g., a soft keyboard may be displayed when keyboard entry is needed). Furthermore, user device 112 may also include a microphone and voice recognition software to supplement or replace the keyboard. The user interface 510 also includes one or more output devices 512 such as an audio output device 514, such as speakers 516 or an audio output connection (e.g., audio jack) for connecting to speakers, earphones, or headphones.

The memory 530 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 530 includes one or more storage devices remotely located from the processors 502. The memory 530, or alternatively the non-volatile memory devices within the memory 530, includes a non-transitory computer-readable storage medium. In some implementations, the memory 530 or the computer-readable storage medium of the memory 530 stores the following programs, modules, and data structures, or a subset or superset thereof:

an operating system 532, which includes procedures for handling various basic system services and for performing hardware dependent tasks;

a network communication module 534, which is used for connecting the user device 112 to other computers and devices via the one or more communication network interfaces 520 (wired or wireless), such as the Internet, other wide area networks, local area networks, metropolitan area networks, and so on;

user interface module 536 for providing user interfaces for the user to interact with the user device 112 via applications on the user device 112 and the operating system 532 of the user device 112;

EVCS application 538 for communicating with an EVCS 100 or a server system 120 that supports the EVCS 100. The EVCS application 538 includes an authentication module 540 for authenticating the user device 112, so that the user device 112 can access (e.g., log into) a user profile (e.g., user account) on the EVCS application 538, affiliate the user device 112 to an EVCS 100, and/or grant the EVCS 100 permission to access information and features of the user device 112, a charge monitoring module 542 for providing updates on a charge status of an electric vehicle 110 that is associated with the user profile and using (e.g., plugged into, being charged by, parked at) EVCS 100 (e.g., status updates such as "Your vehicle is 70% charged", "Your vehicle has completed charging", "Your vehicle is fully charged", "Your free-charge time is up in 15 minutes"), and a user information module 548 that allows a user to create, delete, or update their profile (e.g., a user may update a profile to include a make and model of their vehicle);

a web browser application 550 for accessing the internet and accessing websites on the internet, including providing functionalities on the EVCS application 538 via a website accessed through web browser application 550;

other applications 552 that the user 114 may have installed on the user device 112 or that may have been included as default applications on the user device 112; and network interface data 560 for storing and accessing information related to the network interfaces 520. The network interface data 560 includes network identifiers 562 of the user device 112. As used herein, network identifiers 562 are unique identifiers for a network interface that is transmitted wirelessly. In some embodiments, network identifiers 562 are wireless identifiers. Note that the same network identifier 562 may be used for wired connections (e.g., Ethernet), but is still considered a "wireless identifier" by virtue of being transmitted wirelessly. Thus, as used herein, a wireless identifier is a wirelessly transmitted identifier. In some embodiments, a wireless identifier is a wirelessly transmitted network identifier.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 530 stores a subset of the modules and data structures identified above. Furthermore, the memory 530 may store additional modules or data structures not described above.

Although FIG. 5 shows a user device 112, FIG. 5 is intended more as a functional description of the various features that may be present rather than as a structural schematic of the implementations described herein. In practice, and as recognized by those of ordinary skill in the art, items shown separately could be combined and some items could be separated.

Figure 6:
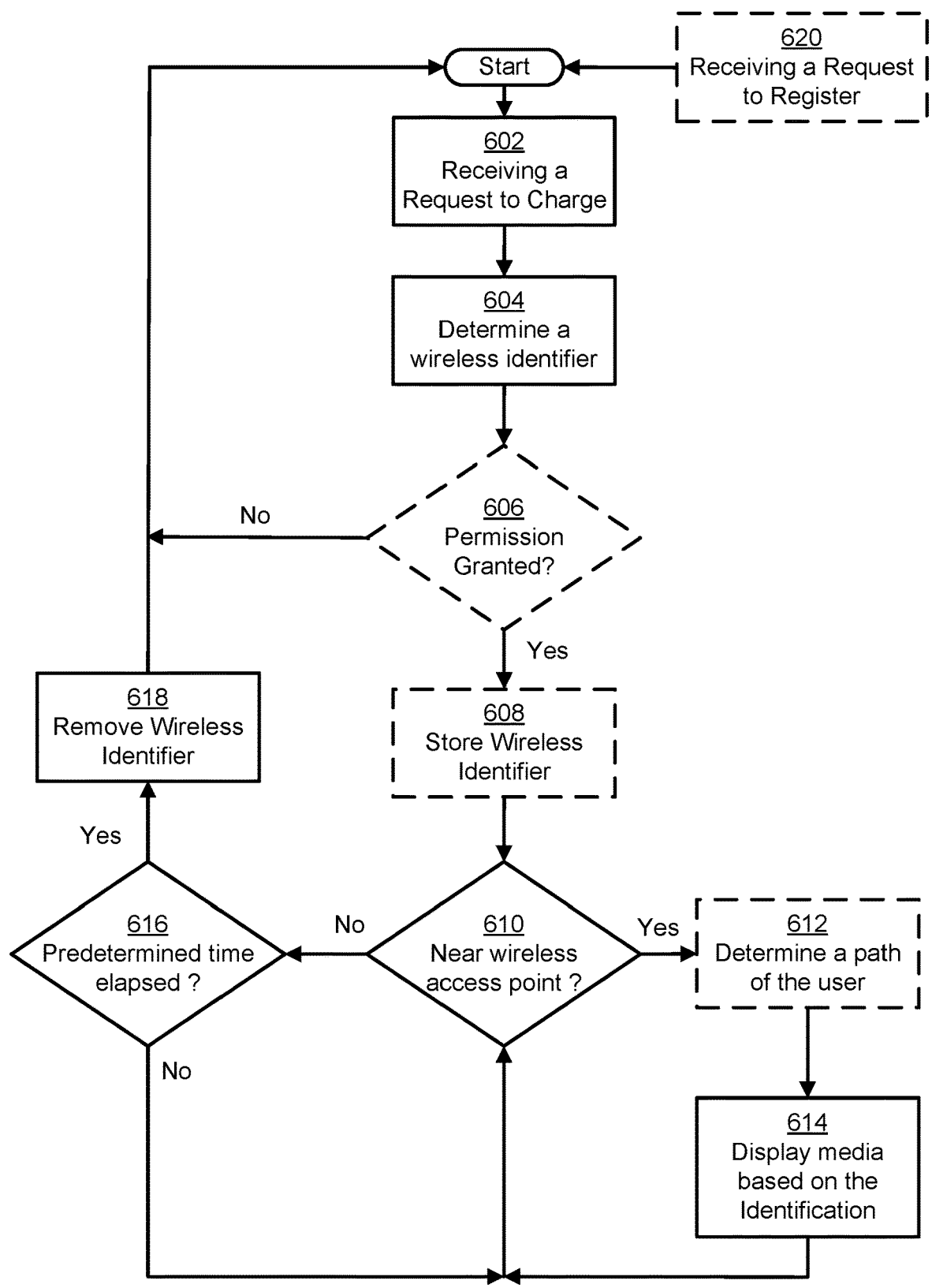
FIG. 6 illustrates a process for determining and tracking a wireless identifier of a user device, in accordance with some implementations.

FIG. 6 illustrates a process for determining and tracking a network identifier 562 of a user device 112, accordance with some implementations. The network identifier 562 can be determined by an EVCS 100 and/or server 120. For brevity, the determination of the network identifier 562 is described with respect to the EVCS 100. At operation 602, the EVCS 100 receives a request to charge an electric vehicle 110. In some implementations, the request to charge is initiated by an electronic device of the user 114 (e.g., user device 112; FIG. 5) with the EVCS 100. Thus, the request to charge the electric vehicle is an example of a request to affiliate the user device 112 with the EVCS 100. In some implementations, the request to affiliate the user device 112 with the EVCS 100 is received from an EVCS application 538 running on the user device 112. In some implementations, the request to charge is received while the user device 112 is proximal to the EVCS 100 (or a WAP 116; FIG. 1). In some implementations, proximal means within a predefined radius (e.g., 3 meters, 5 meters) from a housing of the EVCS 100 (or the WAP 116).

In some implementations, the EVCS application 538 is unauthorized to access the network identifier 562 (e.g., MAC address) directly from the user device 112. The EVCS application 538 is a third-party application running on the user device 112, and a developer of an operating system 523 (FIG. 5) of the user device 112 may not allow applications by third-party developers to access the network identifier 562. Additionally or alternatively, in some implementations, the user device 112 does not allow the EVCS application 538 to read or view the network identifier 562 on the user device 112.

The EVCS 100, in response to receiving the request to affiliate with the user device 112, performs operation 604. At operation 604, the EVCS 100 determines a network identifier 562 of the user device 112. The EVCS 100 detects the network identifier 562 is using a WAP 116 that is proximal to the EVCS 100 (e.g., formed with the EVCS 100 or less than 1 meter from the EVCS 100). In some implementations, the EVCS 100 determines the network identifier 562 of the user device 112 by examining a log of network addresses communicating with the WAP 116 of the EVCS 100. Alternatively or additionally, in some implementations, the EVCS 100 determines the network identifier 562 of the user device 112 by selecting the network identifier 562 from a set of network identifiers 562 of electronic devices communicating with the WAP 116. The EVCS 100 selects the network identifier 562 based on a direction from which communications from the user device 112 are received by the WAP 116 of the EVCS 100. In some implementations, the EVCS 100 can determine the network identifiers 562 of a user device 112 through beamforming. For example, a WAP 116 can receive communication signals from two electronic devices and determine a MAC address of the user device 112 based on the direction of the communication signals received by the WAP 116 (e.g., using an array of receivers to determine direction).

In some implementations, the EVCS 100 can communicatively couple with the user device 112 through Bluetooth. The EVCS 100 can request and receive (e.g., via a beacon signal) the Bluetooth MAC address (along with permission to use the MAC address).

In some implementations, the EVCS 100 performs operation 606 and determines whether the user 114 has granted the EVCS 100 permission use the network identifier 562 of the user device 112. In some implementations, the EVCS 100 requests permission to use the network identifier 562 of the user device 112 via the EVCS application 538. In some implementations, the request to affiliate the user device 112 with the EVCS 100 includes a request for the user's 114 express permission to identify and allow use of the network identifier 562 of the user device 112. In some implementations, the EVCS 100 request the user's 114 express permission to use the network identifier 562 of a device in exchange for free charging. For example, during a check-in process, the EVCS application 538 may ask a user 114 for permission to track the user device 112, using the user device's 112 network identifier 562, in exchange for free charging. In some implementations, the EVCS application 538 displays a message to approve of tracking. Alternatively, the message can be displayed one or more displays 210 (FIG. 2) of the EVCS 100. For example, the EVCS application 538 can display the following message, "Approve MAC address tracking? If yes, and you visit Acme, Corp., you will receive two hours of free charging."

In some implementations, if the user 114 does not grant the EVCS 100 permission to use the network identifier 562 of the user device 112, the EVCS 100 returns to the start of the process and waits to receive a request to charge (e.g. operation 602). Alternatively, in some implementations, if the user 114 does not grant the EVCS 100 permission to use the network identifier 562 of the user device 112, the EVCS 100 forgoes using the network identifier 562 of the user device 112; however, the user 114 may be required to pay for charging her electric vehicle 110.

In some implementation, if the user 114 does grant the EVCS 100 permission to use the network identifier 562 of the user device 112, the EVCS 100 will track the user device 112 using other wireless access points (e.g., located throughout the geographical area). In some implementations, the EVCS 100 performs operation 608 and stores the network identifier 562 (after the user 114 grants permission to the EVCS 100). The network identifier 562 is stored in memory (e.g. memory 320 and/or 420) as an anonymized identifier of the user 114. In some embodiments, the network identifier 562, when stored, is anonymized to protect the identity and/or information of the user 114 and/or the user device 112. In this way, if the information from the EVCS 100 was maliciously extracted (e.g., a security breach or other form of hacking), the stored information cannot be used against the user 114, used to track the user 114, or used to identify the user 114.

The EVCS 100 performs operation 610 and determines whether the user device 112 is near a WAP 116 (e.g. WAP 116 of the EVCS 100 or any WAP 116 associated with the server system 120). In particular, each WAP 116 includes a geo-fenced region that detects the presence of a user device 112 through the network identifier 562 (while the user device 112 is within the geo-fenced region). In some implementations, the geo-fenced region is defined by a predefined radius. In some embodiments, the geo-fenced region is relatively small (e.g., 10 meter, 20 meters), so as to locate the user with a fair degree of precision. In some implementations, other EVCSs 100 or other devices associated with the server system 120 determine whether the user device 112 is near their corresponding WAP 116. In some implementations, the EVCS 100 receives an indication that another WAP 116, distinct from the WAP 116 the EVCS 100, is in communication with the user device 112. The indication that the user device 112 is in communication with another WAP 116 is based on the other WAP 116 detecting the network identifier 562 of the user device 112 (inside its geo-fenced region). Based on the indication that the other WAP 116 is communicating with the user device 112, the EVCS 100 determines that the user device 112 (and the user 114) is proximal to the other WAP 116 (e.g., within the geo-fenced region). For example, a user device 112 can be affiliated with a first EVCS 100 through a first WAP 116, and the user 114 can walk away from the first EVCS 100. When the user 114 approaches a second EVCS 100 (or a second WAP 116), an indication that the user 114 (or user device 112) is proximal to the second EVCS 100 (or the second WAP 116) is generated (and provided) to the first EVCS 100 and/or server system 120. In some embodiments, the second WAP is not associated with an EVCS. In some embodiments, the second WAP is located within a store (e.g., the store that the user agreed to visit in exchange for free parking).

In some implementations, a first WAP 116 is located at least 100 meters away from a second WAP 116. In some implementations, the WAP 116 of the EVCS 100 is located outdoors and the second WAP is located indoors. For example, a commercial building (e.g., a retail store) or other buildings (e.g., parking structures) can include a second WAP 116 associated with the server system 120, and the second WAP 116 can determine when a user device 112 affiliated with an EVCS 100 (via a first WAP 116) is proximal to the commercial building (or the second WAP 116).

In some implementations, after an affiliated user device 112 is detected near the EVCS 100 (or another WAP 116 associated with the server system 129), the EVCS 100 performs operation 612 and determines a path of the user 114. For example, the EVCS 100 can track the movement of the user device 112 as it moves from one geo-fenced region to another. For example, an affiliated EVCS 100 can receive an indication that another WAP 116, distinct from the WAP 116 of the affiliated EVCS 100, is communicating with the user device 112 (based on the network identifier 562 of the user device 112) and, based on the indication that the other WAP 116 is communicating with the user device 112, determine a path of the user device 112 (and the user 114). In other words, a path of the user device 112 (and the user 114) can be determined as the user device 112 moves between WAPs 116.

In some implementations, the EVCS 100 determines whether the user 114 visited a commercial building or other location. For example, in exchange for free charging, the EVCS 100 will require the user to visit one or more businesses (e.g., retail stores, restaurants, etc.). In order to verify that the user 114 visited the one or more businesses, the EVCS 100 will track a path of the user device 112 and determine that the user 114 visited (e.g., was proximal to) the one or more businesses. Alternatively, the one or more businesses include a corresponding WAP 116 associated with the server system 120 and the EVCS 100 will determine that the user 114 visited the one or more businesses when the user device 112 enters a corresponding geo-fenced region of WAPs 116 corresponding to the one or more business.

In some implementations, the EVCS 100 determines a length of time that the user 114 spent at a particular location. For example, the EVCS 100 can determine that the user 114 spent 1 min., 10 min., 30 min., 1 hour, 3 hours, etc. at a shopping mall, a retail store, a restaurant, and/or other locations.

The EVCS 100, after determining that the user device 112 affiliated with the EVCS 100, the EVCS 100 performs operation 614 and displays media based on the identification of the user device 112 (proximal to the WAP 116). In some implementations, media content is selected based on a profile of the user 114. In some implementations, the media content is selected based on the location of the user 114. For example, the media content can be selected based on retail stores near the user's 114 location. Alternatively, the media content is selected based on the businesses (e.g., retail stores, apartments, etc.) that the user 114 visited and/or the amount of time spent at the business.

In some implementations, the media is presented on another EVCS 100 or other device (that is in communication with a WAP 116 associated with the server system 120). For example, when the user device 112 is proximal to a second EVCS 100, distinct from an affiliated (first) EVCS 100, the second EVCS 100 displays media content to the user 114. As another example, when the user device 112 is proximal to a wireless access point of a retail store (associated with server system 120), one or more displays within the retail store display media content to the user 114.

In some implementations, the geo-location of the user device 112 is stored in memory (e.g. memory 320 and/or memory 420) with the anonymized identifier for the user 114. For example, in some implementations, a path that a user 114 travels can be determined and stored in memory. In some implementations, certain actions by the user 114 are stored with the anonymized identifier for the user 114. For example, web searches, application usage, and/or other actions by the user 114 (on the user device 112) can be stored with the anonymized identifier of the user 114.

The EVCS 100 monitors the WAPs 116 (e.g., continuously performs operation 610) to determine whether the user device 112 is near the EVCS 100 or other WAPs 116. If the EVCS 100 determines that the user device 112 is not near a WAP 116 for a predetermined amount of time (618), the EVCS 100 performs operation 618 and removes the network identifier 562 of the user device 112. The predetermined amount of time can be 30 min., 1 hour, 3 hours, etc. In this way, the EVCS 100 ends its affiliation with user device 112 and is not able to track the user device 112 once the user 114 leaves an area proximate to the EVCS 100 or other WAPs 116. Further, by removing the network identifier 562 of the user device 112, the EVCS 100 protects the user 114 and their information from being stolen or misused. For example, if the EVCS 100 is hacked or its security system is breached, there is limited or no information corresponding to the user 114. After the network identifier 562 of the user device 112 is removed, the EVCS 100 returns to the start of the process and waits to receive a request to charge (e.g., perform operation 602).

In some implementations, before a request to charge is received by the EVCS 100, the EVCS 100 performs operation 620 and receives, from the user 114, a request to register (or sign up) for a service (e.g., charging) provided by the EVCS 100. In some implementations, the user 114 registers for the service using the EVCS application 538. In response to the request to register for the service provided by the EVCS 100, the EVCS 100 generates a profile for the user 114 that includes an identifier of the user 114 (e.g., username). The user profile can include information corresponding to the user such as a user's car (make and/or model), age and/or sex, interest (e.g., sports, clothing, hobbies, family trips or activities, etc.), preference on advertisements they wish to receive, advertisements they do not want to receive, and/or other information about the user 114. The user profile is stored in memory (e.g. user profile database 332; FIG. 3 or memory 420 of the EVCS 100).

In some implementations, the user profile is used to initiate the request to affiliate the user device 112 with the EVCS 100 and/or request to charge. In some implementations, the network identifier 562 of the user device 112 is stored in the user profile after it is determined (as discussed above). The network identifier 562 is anonymized before it is stored. In some implementations, the stored network identifier 562 of the user device 112 is removed from the user profile, without human intervention, after the predefined amount of time has elapsed (as discussed above). Additional information about the user described above can be stored (and removed) from the user profile.

FIGS. 7A-7D illustrates the affiliation and tracking of a user device by EVCS 100 (and/or server system 120) in accordance with some implementations. A first view 710 shows a user 114 at a first EVCS 702*a* (corresponding to an EVCS 100; FIG. 1). The user 114 parks her electric vehicle 110 in a parking stall corresponding to the first EVCS 702*a*, and interacts with the first EVCS 702*a*. In some implementations, the user 114 interacts with the first EVCS 702*a* through an EVCS application 538 (FIG. 5) on the user device 112. Alternatively, in some implementations, the user 114 interacts with the first EVCS 702*a* through one or more interfaces of the first EVCS 702*a*, such as through a touch screen display or an input keypad on the first EVCS 702*a*. In some implementations, one or more gestures can be used to interact with the first EVCS 702*a*. The user 114 interacts with the first EVCS 702*a* to affiliate her user device 112 to the first EVCS 702*a* and/or to charge her electric vehicle 110. In particular, the user 114 initiates a request to affiliate her user device 112 with the first EVCS 702*a*. In some implementations, the request to affiliate her user device 112 with the first EVCS 702*a* includes a request to charge her electric vehicle 110, and vice versa.

Once the user 114 initiates the request to affiliate her user device 112 with the first EVCS 702*a*, the first EVCS 702*a* determines a network identifier 562 of the user device 112. The first EVCS 702*a* determines the network identifier 562 of the user device 112 using a WAP 116 of the first EVCS 702*a*. For example, the first EVCS 702*a* can determine the network identifier 562 of the user device 112 by identifying the electronic devices communicating with the WAP 116 of the first EVCS 702*a* and determine the network identifier 562 of the user device 112 based on the direction of the communications or the proximity of the communication signals to the first EVCS 702*a*. Additional examples of the determination of the network identifier 562 of the user device 112 are provided above in reference to FIG. 6.

In some implementations, the first EVCS 702*a* requests permission to use the network identifier 562 of the user device 112 before it uses the network identifier 562 of the user device 112. In some implementations, the user 114 grants permission to the first EVCS 702*a* to use the network identifier 562 of the user device 112 when the user initiates the request to affiliate the user device 112 with the first EVCS 702*a*. In some embodiments, a message is displayed to the user 114 requesting the user to grant permission to use the network identifier 562 of the user device 112 (e.g., "allow the charging station to use your MAC address?"). In some implementations, the message is displayed on the user device 112 via the EVCS application 538. Alternatively, the message is displayed on a display of the first EVCS 702*a* (e.g., one or more displays 210; FIG. 2). The user 114 can grant or deny the first EVCS 702*a* permission to use the network identifier 562 of the user device 112 through the EVCS application 538 or one or more interfaces of the first EVCS 702*a*. In some implementation, the message includes one or more conditions for receiving free charging. A non-exhaustive list of the one or more conditions includes visiting one or more locations, remaining at a particular location for a predetermined period of time (e.g., 10 min, 20 min, 1 hour, etc.), interacting with another EVCS 100 (e.g., watching an advertisement on a second EVCS 702*b*), leaving within a predetermined period of time, etc. For example, the message can recite, "for free charging visit, visit Widget Emporium."

A second view 720 shows tracking the user 114. Once the network identifier 562 of the user device 112 has been determined, the first EVCS 702*a* (or a server system coupled with EVCS 702*a*) can track the user 114 through her user device 112. In some implementations, the first EVCS 702*a* (or a server system coupled with EVCS 702*a*) uses a first geo-fenced region 704*a* corresponding to the WAP 116 of the first EVCS 702*a* to track the user device 112 (e.g., tracking the user comprises determining that the user device 112 remains in the first geo-fenced region 704*a*). In some embodiments, the geo-fenced region 704*a* is a predetermined radius (e.g. 100 meters).

A third view 730 shows the user 114 approaching a second EVCS 702*b*. In particular, the third view 730 shows the user 114 moving from the first geo-fenced region 704*a* to a second geo-fenced region 704*b* (of a second WAP 116 of the second EVCS 702*b*). The EVCSs 100 (or server system) can determine when the user device 112 enters or leaves a geo-fenced region of a particular WAP 116. For example, the first EVCS 702a determines when the user device 112 leaves the first geo-fenced region 704a (e.g., first exit point 707a), and determines when the user device 112 enters the second geo-fenced region 704b (e.g., first entry point 707b). In some implementations, the first EVCS 702a receives an indication when the user device 112 is detected by the second EVCS 702b.

In some implementations, the EVCSs 100 (or server system) uses knowledge of entry and exit from the geo-fenced regions of WAPs 116 (points where the user device 112 enters and exits the geo-fenced regions) to determine a path 706 of the user. For example, the EVCSs 100 (or server system 120) can determine the path 706 of the user 114 from first geo-fenced region 704a to the second geo-fenced region 704b based on the location of the first exit point 707a, the location of the first entry point 707b, and the time between the determination of the first exit point 707a and the first entry point 707b.

In some implementations, when the user device 112 approaches the second EVCS 702b, the second EVCS 702b displays to the user 114 media content (on one or more displays 210 of the second EVCS 702b; FIG. 2). In some implementations, the media content is selected based on the path 706 of the user 114. For example, one or more advertisements corresponding to one or more stores along the path 706 can be displayed to the user 114 as she approaches the second EVCS 702b. Additional examples of the media content provided to the user 114 are provided above with reference to FIG. 6.

A fourth view 740 shows the user 114 approaching a business associated with the server system 120. In the fourth view 740, the user 114 moves from the second geo-fenced region 704b of the second WAP 116 of the second EVCS 702b to a third geo-fenced region 704c of a third WAP 116 of a retail business 750. The third WAP 116 is associated to the server system 120 and can be used to track the user device 112. Like the third view 730, the first EVCSs 702a determines the path 706 of the user 114 by using a second exit point 707c, second entry point 707d.

The first EVCS 702a can verify that the user 114 visited the retail business 750 when the user device 112 is detected entering or within the third geo-fenced region 704c of the third WAP 116 (of a retail business 750). In this way, the first EVCS 702a can determine that the user 114 has met the requirements for free charging.

Figure 8A:
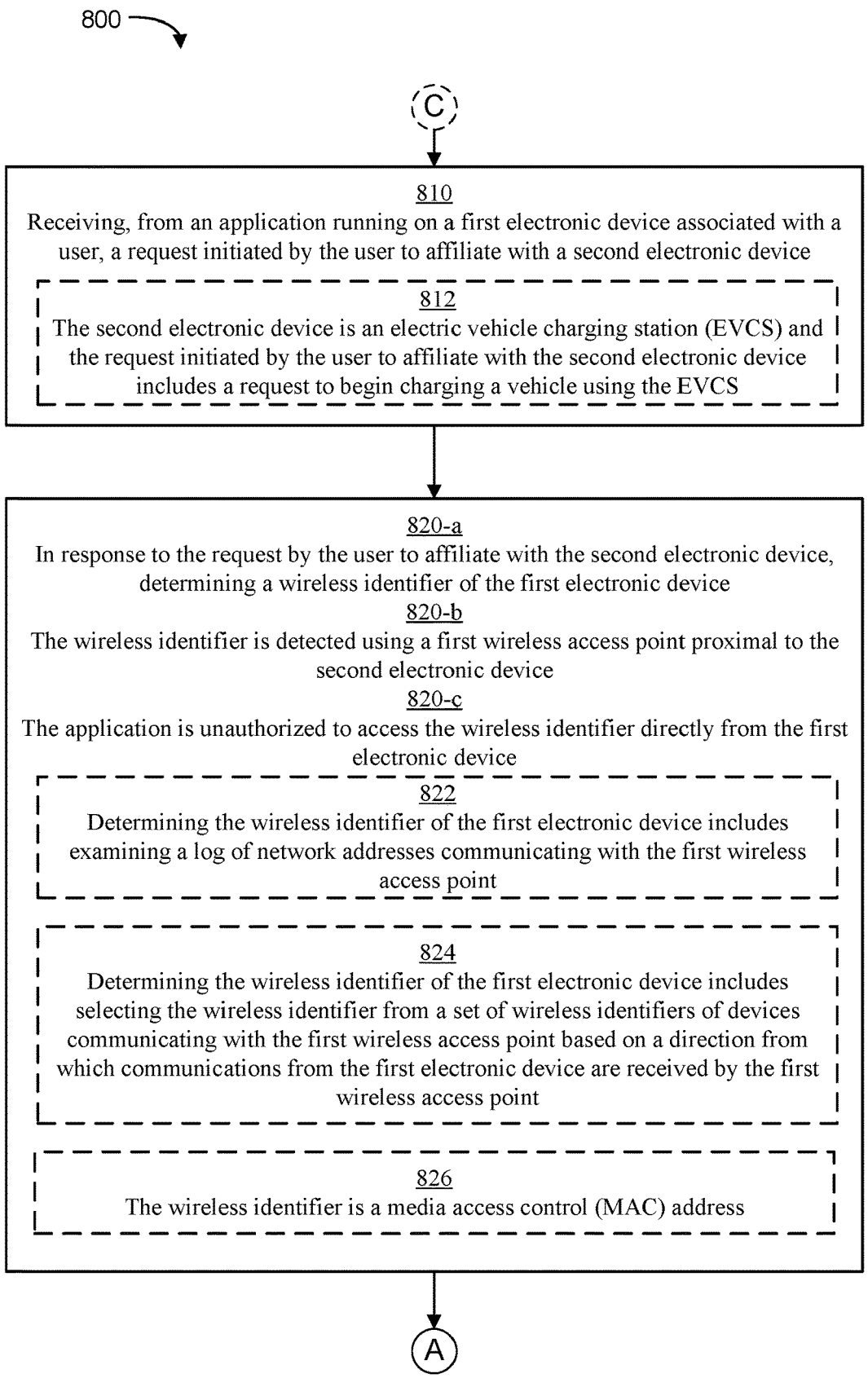
FIGS. 8A-8C illustrate a flowchart of a method of determining and using a wireless identifier of a user device, in accordance with some implementations.
Figure 8B:
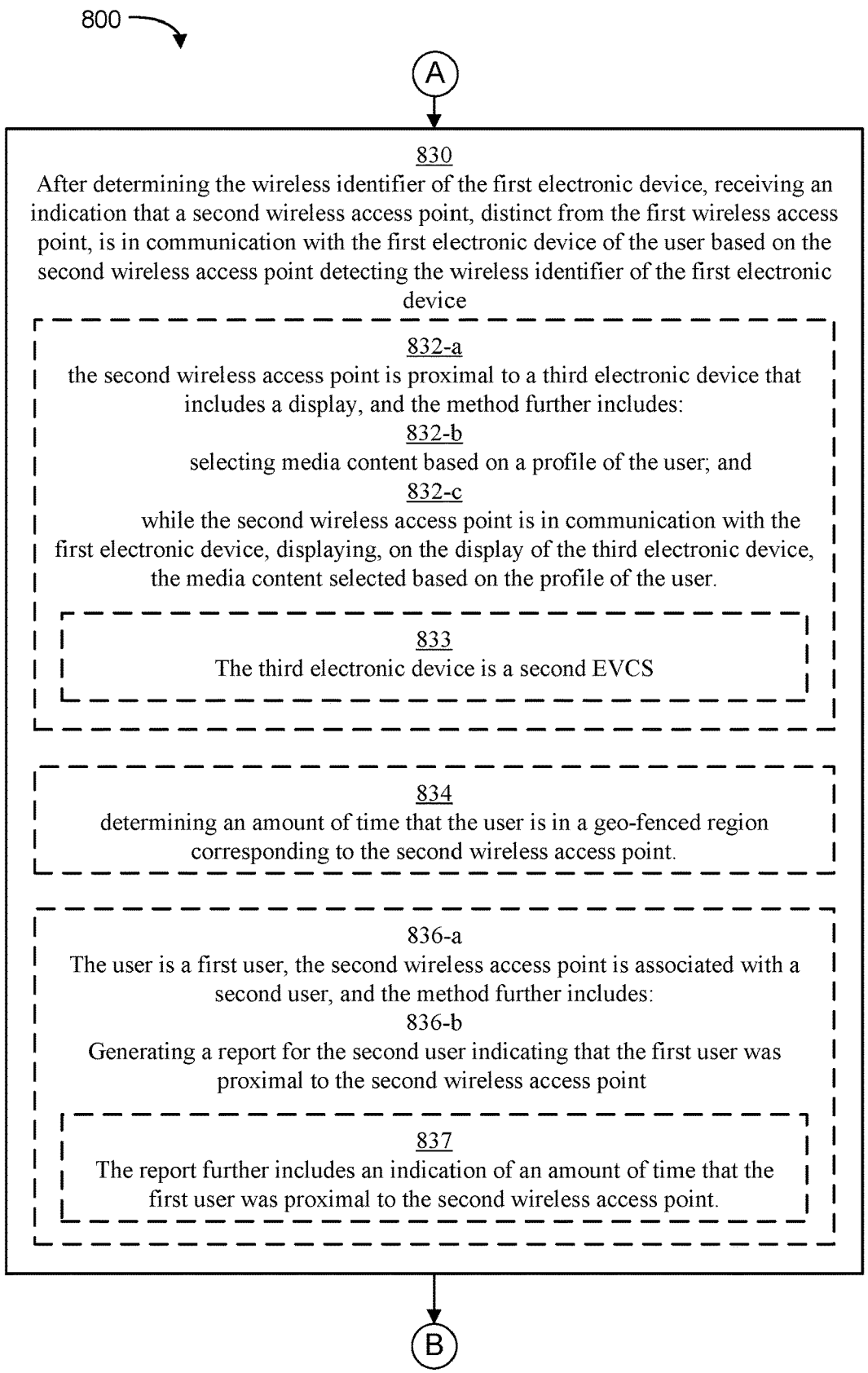
Figure 8C:
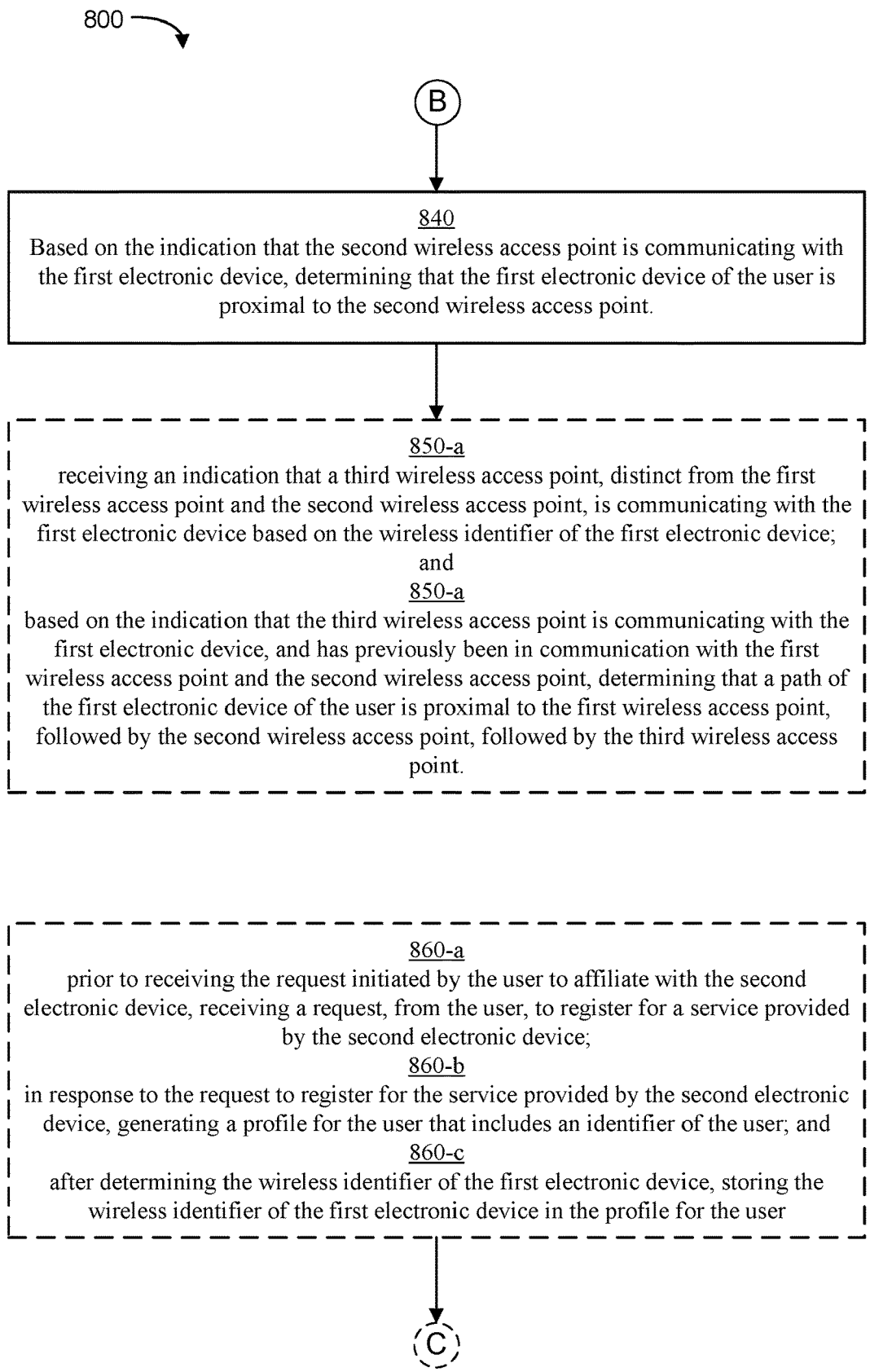

FIGS. 8A-8C illustrate a flowchart of a method 800 of determining and using a network identifier 562 of a user device 112, in accordance with some implementations. The method 800 is performed at a computer system (e.g., a computer system corresponding to server system 120 or a computer system of EVCS 100). The computer system includes or is communicatively coupled to a WAP 116 (e.g., communication interface(s) 310 or communication interface (s) 414). The computer system includes one or more processors (e.g., CPU(s) 302 or CPU(s) 404) and memory (e.g., memory 320 or memory 420). In some instances and implementations, the various operations of the methods described herein are interchangeable, and respective operations of the methods are performed by any of the aforementioned devices, systems, or combination of devices and/or systems. For convenience, the method 800 operations will be described below as being performed by an EVCS 100, but should not be construed as limiting the performance of the operation to the EVCS 100 in all implementations. For example, in some implementations, a server system 120 is in communication and configured to work in conjunction with one or more EVCSs 100 (and/or WAPs 116).

The method 800 includes receiving (810), from an application (e.g., EVCS application 538; FIG. 5) running on a first electronic device associated with a user 114, a request to affiliate with a second electronic device. The request is initiated by the user 114. In some implementations, the request is received while the first electronic device is proximal to the second electronic device. Alternatively, in some implementation, the request is received through user 114 interaction with an interface of the second electronic device. In some implementations, the first electronic device includes a user device 112 (FIG. 1 and FIG. 5). In some implementations, the second electronic device is an EVCS 100 (FIG. 1 and FIG. 4), and the request initiated by the user 114 to affiliate with the second electronic device includes (812) a request to begin charging an electric vehicle 110 using the EVCS 100.

In some implementations, the second electronic device is formed with the computer system. For example, the computer system resides within a housing 202 of an EVCS 100 (FIG. 4). Alternatively, in some implementations, the computer system is a remote device (e.g., a server system 120) that communicates with the second electronic device over a network 122 (FIG. 1). For example, in some implementations, a server system 120 and EVCS 100 are communicatively coupled.

The method 800 includes, in response to the request by the user 114 to affiliate with the second electronic device, determining (820-a) a network identifier 562 of the first electronic device. In some implementations, the request initiated by the user to affiliate with the second electronic device includes the user's 114 express permission to identify and use the network identifier 562. For example, in some implementations, during a check-in process, the EVCS application 538 asks the user for permission to track the user device 112. In some implementations, the second electronic device requests for permission to identify and use the network identifier 562 of the first electronic device in exchange for free charging. For example, an EVCS 100 can request the use of a user device's 112 MAC address in exchange for free charging. In some implementations, the request for permission includes a message displayed on the EVCS application 538. Alternatively, in some implementations, the request for permission includes a message displayed on a display of the second electronic device (e.g., one or more displays 210 of an EVCS 100).

The network identifier 562 is detected (820-b) using a first WAP 116 proximal to the second electronic device. In some implementations, the first WAP 116 is formed with the second electronic device. For example, the first WAP 116 can resides within the housing 102 of the EVCS 100 (e.g., communications interface(s) 414). In some implementations, the first WAP 116 is separate from the second electronic device but located closely enough to the second electronic device to detect electronic devices near the second electronic device. For example, the first WAP 116 is configured to communicate with a user standing next to the EVCS 100. The EVCS application 538 is unauthorized (820-c) to access the network identifier 562 directly from the first electronic device (without the user granting permission). In some implementations, the EVCS application 538 is a third-party application running on the first electronic device and the developer of the operating system of the first electronic device does not allow applications by third-party developers to access the network identifier 562. In some implementations, the first electronic device does not allow the EVCS application 538 to read or view the network identifier 562 on the first electronic device.

In some implementations, determining (822) the network identifier 562 of the first electronic device includes examining a log of network addresses communicating with the first WAP 116. In some implementations, determining (824) the network identifier 562 of the first electronic device includes selecting the network identifier 562 from a set of network identifiers 562 of electronic devices communicating with the first WAP 116 based on a direction from which communications from the first electronic device are received by the first WAP 116. For example, a WAP 116 of an EVCS 100 can identify two electronic devices and determine, based on the direction (or proximity) of the communication signals, the network identifier 562 of a user device 112 can be determined (e.g., communication signal nearest or proximate to the WAP 116).

In some implementations, the network identifier 562 includes (826) a MAC address. In some implementations, the network identifier 562 includes an IP address, Wi-Fi address, Bluetooth address, physical (or Ethernet) address, or other unique identifiers for an electronic device.

The method includes, after determining the network identifier 562 of the first electronic device, receiving an indication that a second WAP 116, distinct from the first WAP 116, is in communication with the first electronic device of the user based on the second WAP 116 detecting (830) the network identifier 562 of the first electronic device. For example, as described above with reference to FIGS. 7A-7D, when a user device 112 enters a geo-fenced region of a WAP 116, an indication is provide to an affiliated EVCS 100 (or server system 120). In some implementations, the second WAP 116 is (832-*a*) proximal to a third electronic device that includes a display. The method further includes selecting (832-*b*) media content based on a profile of the user, and while the second WAP 116 is in communication with the first electronic device, displaying (832-*c*), on the display of the third electronic device, the media content selected based on the profile of the user. In some implementations, the third electronic device is (833) a second EVCS. For example, as described above with reference to FIGS. 6 and 7A-7D, media content can be presented to a user 114 as the user 114 approaches an EVCS 100. In some implementations, the method 800 includes determining (834) an amount of time that the user is in a geo-fenced region corresponding to the second WAP 116.

In some implementations, the user is a first user; the second WAP 116 is associated (836-*a*) with a second user; and the method further includes generating (836-*b*) a report for the second user indicating that the first user was proximal to the second WAP 116. In some embodiments, the second user is a retailer (e.g., the retailer offering the promotion for free charging at the EVCS). In some implementations, the report is anonymized with respect to the first user. For example, in some implementations, the second WAP 116 is located within a retail area. The report includes statistical information (e.g., indicating a percentage of users who affiliate with the second electronic device and subsequently visit a retail area). The report is provided to the first user without providing the identity of other users. In some implementations, the report further includes (837) an indication of an amount of time that the first user was proximal to the second WAP 116. Additional examples of the information included in the report is described above with reference to FIG. 6.

The method 800 includes based on the indication that the second WAP 116 is communicating with the first electronic device, determining (840) that the first electronic device of the user is proximal to the second WAP 116. For example, as described above with reference to FIGS. 7A-7D, the user device 112 can be tracked by geo-fenced regions of WAPs 116.

In some implementations, the method 800 includes receiving (850-*a*) an indication that a third WAP 116, distinct from the first WAP 116 and the second WAP 116, is communicating with the first electronic device based on the network identifier 562 of the first electronic device, and; based on the indication that the third WAP 116 is communicating with the first electronic device, and has previously been in communication with the first WAP 116 and the second WAP 116; determining (850-*b*) that a path of the first electronic device of the user is proximal to the first WAP 116, followed by the second WAP 116, followed by the third WAP 116. FIGS. 7A-7D provide examples of the EVCS 100 determining a path of the user 114.

In some implementations, the method 800 includes prior to receiving the request initiated by the user 114 to affiliate with the second electronic device, receiving (860-*a*) a request, from the user 114, to register for a service provided by the second electronic device. In some implementations, the user 114 signs up for the service using the EVCS application 538. The method includes, in response to the request to register for the service provided by the second electronic device, generating (860-*b*) a profile for the user 114 that includes an identifier (e.g., user account or username) of the user 114, and, after determining the network identifier 562 of the first electronic device, storing (860-*b*) the network identifier 562 of the first electronic device in the profile for the user 114. In some implementations, the network identifier 562 is removed from the profile of the user, without human intervention, after a predefined amount of time (to protect the privacy of the user 114).

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described implementations. The first widget and the second widget are both widget, but they are not the same condition unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method comprising:
at a computer system that includes one or more processors and memory:
receiving, from a respective application running on a first electronic device associated with a user, a request initiated by the user to affiliate with a second electronic device;
in response to the request by the user to affiliate with the second electronic device, determining a wireless identifier of the first electronic device, wherein:
the wireless identifier is detected using a first wireless access point proximal to the second electronic device,
the respective application is unauthorized to access the wireless identifier directly from the first electronic device;
after determining the wireless identifier of the first electronic device, receiving an indication that a second wireless access point, distinct from the first wireless access point, is in communication with the first electronic device of the user based on the second wireless access point detecting the wireless identifier of the first electronic device; and
based on the indication that the second wireless access point is communicating with the first electronic device, determining a location of the first electronic device, including determining that the first electronic device of the user is proximal to the second wireless access point.

2. The method of claim 1, wherein the second electronic device is an electric vehicle charging station (EVCS) and the request initiated by the user to affiliate with the second electronic device includes a request to begin charging a vehicle using the EVCS.

3. The method of claim 1, further including, prior to receiving the request initiated by the user to affiliate with the second electronic device:
receiving a request, from the user, to register for a service provided by the second electronic device;
in response to the request to register for the service provided by the second electronic device, generating a profile for the user that includes an identifier of the user; and
after determining the wireless identifier of the first electronic device, storing the wireless identifier of the first electronic device in the profile for the user.

4. The method of claim 1, wherein determining the wireless identifier of the first electronic device comprises examining a log of network addresses communicating with the first wireless access point.

5. The method of claim 1, wherein the wireless identifier includes a media access control (MAC) address.

6. The method of claim 1, determining the wireless identifier of the first electronic device comprises:
selecting the wireless identifier from a set of wireless identifiers of devices communicating with the first wireless access point based on a direction from which communications from the first electronic device are received by the first wireless access point.

7. The method of claim 1, further comprising, determining an amount of time that the user is in a geo-fenced region corresponding to the second wireless access point.

8. The method of claim 1, wherein:
the second wireless access point is proximal to a third electronic device that includes a display; and
the method further includes:
selecting media content based on a profile of the user; and
while the second wireless access point is in communication with the first electronic device, displaying, on the display of the third electronic device, the media content selected based on the profile of the user.

9. The method of claim 8, wherein the third electronic device is a second EVCS.

10. The method of claim 1, further comprising:
receiving an indication that a third wireless access point, distinct from the first wireless access point and the second wireless access point, is communicating with the first electronic device based on the wireless identifier of the first electronic device; and
based on the indication that the third wireless access point is communicating with the first electronic device, and has previously been in communication with the first wireless access point and the second wireless access point, determining that a path of the first electronic device of the user is proximal to the first wireless access point, followed by the second wireless access point, followed by the third wireless access point.

11. The method of claim 1, wherein:
the user is a first user;
the second wireless access point is associated with a second user; and
the method further includes:
generating a report for the second user indicating that the first user was proximal to the second wireless access point.

12. The method of claim 11, wherein the report further includes an indication of an amount of time that the first user was proximal to the second wireless access point.

13. A server system, comprising:
a computer system having one or more processors and memory storing one or more programs, the computer system configured to:
receive, from a respective application running on a first electronic device associated with a user, a request initiated by the user to affiliate with a second electronic device;
in response to the request by the user to affiliate with the second electronic device, determine a wireless identifier of the first electronic device, wherein:
the wireless identifier is detected using a first wireless access point proximal to the second electronic device,
the respective application is unauthorized to access the wireless identifier directly from the first electronic device;
after determining the wireless identifier of the first electronic device, receive an indication that a second wireless access point, distinct from the first wireless access point, is in communication with the first electronic device of the user based on the second wireless access point detecting the wireless identifier of the first electronic device; and
based on the indication that the second wireless access point is communicating with the first electronic device, determine a location of the first electronic device, including determining that the first electronic device of the user is proximal to the second wireless access point.

14. The server system of claim 13, wherein the second electronic device is an electric vehicle charging station (EVCS) and the request initiated by the user to affiliate with the second electronic device includes a request to begin charging a vehicle using the EVCS.

15. The server system of claim 13, wherein prior to receiving the request initiated by the user to affiliate with the second electronic device, the computer system is further configured to:
    receive a request, from the user, to register for a service provided by the second electronic device;
    in response to the request to register for the service provided by the second electronic device, generate a profile for the user that includes an identifier of the user; and
    after determining the wireless identifier of the first electronic device, store the wireless identifier of the first electronic device in the profile for the user.

16. The server system of claim 13, wherein determining the wireless identifier of the first electronic device includes examining a log of network addresses communicating with the first wireless access point.

17. The server system of claim 13, wherein the wireless identifier includes a media access control (MAC) address.

18. The server system of claim 13, wherein determining the wireless identifier of the first electronic device includes:
    selecting the wireless identifier from a set of wireless identifiers of devices communicating with the first wireless access point based on a direction from which communications from the first electronic device are received by the first wireless access point.

19. The server system of claim 13, wherein the computer system is further configured to determine an amount of time that the user is in a geo-fenced region corresponding to the second wireless access point.

20. A non-transitory computer readable storage medium storing instructions that, when executed by a computer system having one or more processors, cause the computer system to:
    receiving, from a respective application running on a first electronic device associated with a user, a request initiated by the user to affiliate with a second electronic device;
    in response to the request by the user to affiliate with the second electronic device, determining a wireless identifier of the first electronic device, wherein:
        the wireless identifier is detected using a first wireless access point proximal to the second electronic device,
        the respective application is unauthorized to access the wireless identifier directly from the first electronic device;
    after determining the wireless identifier of the first electronic device, receiving an indication that a second wireless access point, distinct from the first wireless access point, is in communication with the first electronic device of the user based on the second wireless access point detecting the wireless identifier of the first electronic device; and
    based on the indication that the second wireless access point is communicating with the first electronic device, determining a location of the first electronic device, including determining that the first electronic device of the user is proximal to the second wireless access point.

* * * * *